(12) United States Patent
Dinh et al.

(10) Patent No.: US 11,616,988 B2
(45) Date of Patent: Mar. 28, 2023

(54) METHOD AND DEVICE FOR EVALUATING SUBJECTIVE QUALITY OF VIDEO

(71) Applicant: SAMSUNG ELECTRONICS CO., LTD., Suwon-si (KR)

(72) Inventors: Quockhanh Dinh, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/286,743

(22) PCT Filed: Sep. 26, 2019

(86) PCT No.: PCT/KR2019/012510
§ 371 (c)(1),
(2) Date: Apr. 19, 2021

(87) PCT Pub. No.: WO2020/080698
PCT Pub. Date: Apr. 23, 2020

(65) Prior Publication Data
US 2021/0385502 A1 Dec. 9, 2021

(30) Foreign Application Priority Data

Oct. 19, 2018 (KR) .................. 10-2018-0125406
Apr. 8, 2019 (KR) .................. 10-2019-0041102

(51) Int. Cl.
*H04N 19/85* (2014.01)
*H04N 19/132* (2014.01)
(Continued)

(52) U.S. Cl.
CPC .............. *H04N 19/85* (2014.11); *G06N 3/02* (2013.01); *H04N 19/132* (2014.11); *H04N 19/184* (2014.11)

(58) Field of Classification Search
CPC ...... G06N 3/02; H04N 19/184; H04N 19/132; H04N 19/85
(Continued)

(56) References Cited

U.S. PATENT DOCUMENTS 7,308,031 B2 12/2007 Yamaguchi et al.
7,400,588 B2 7/2008 Izzat et al.
(Continued)

FOREIGN PATENT DOCUMENTS

CN 108022212 A 5/2018
JP 2008-527810 A 7/2008
(Continued)

OTHER PUBLICATIONS

Communication dated Jun. 21, 2021, issued by the Korean Patent Office in counterpart Korean Patent Application No. 10-2019-0041109.
(Continued)

*Primary Examiner* — On S Mung
(74) *Attorney, Agent, or Firm* — Sughrue Mion, PLLC

(57) ABSTRACT

Proposed are a method and apparatus for evaluating the quality of an image, the method including obtaining blocks each having a predetermined size by splitting a target image for evaluating a quality and a reference image that is to be compared with the target image, determining sensitivity information and quality assessment information of each of the blocks by inputting the blocks to a video quality assessment network, and determining a final image quality assessment score of the target image by combining the pieces of quality assessment information of the blocks with each other, based on the pieces of sensitivity information of the blocks.

9 Claims, 16 Drawing Sheets

(51) Int. Cl.
*H04N 19/184* (2014.01)
*G06N 3/02* (2006.01)

(58) Field of Classification Search
USPC .................................................. 375/240.26
See application file for complete search history.

(56) References Cited

U.S. PATENT DOCUMENTS

| | | | |
|---|---|---|---|
| 8,184,164 | B2 | 5/2012 | Yang et al. |
| 9,251,572 | B2 | 2/2016 | Shu et al. |
| 9,679,213 | B2 | 6/2017 | Yang et al. |
| 9,749,580 | B2 | 8/2017 | Suh et al. |
| 10,148,723 | B2 | 12/2018 | Falvo |
| 10,218,971 | B2 | 2/2019 | Dong et al. |
| 11,200,639 | B1 | 12/2021 | Kim et al. |
| 11,200,702 | B2 | 12/2021 | Dinh et al. |
| 2007/0189392 | A1 | 8/2007 | Tourapis et al. |
| 2012/0230604 | A1 | 9/2012 | Yamajo et al. |
| 2014/0086319 | A1 | 3/2014 | Xu et al. |
| 2014/0177706 | A1 | 6/2014 | Fernandes et al. |
| 2015/0256828 | A1 | 9/2015 | Dong et al. |
| 2016/0163023 | A1 | 6/2016 | Wey et al. |
| 2016/0360155 | A1 | 12/2016 | Civanlar et al. |
| 2017/0104993 | A1* | 4/2017 | Jeong ................. H04N 19/154 |
| 2017/0208345 | A1 | 7/2017 | Jeong et al. |
| 2017/0287109 | A1 | 10/2017 | Tasfi |
| 2017/0347061 | A1 | 11/2017 | Wang et al. |
| 2018/0107925 | A1 | 4/2018 | Choi et al. |
| 2018/0139458 | A1 | 5/2018 | Wang et al. |
| 2018/0174275 | A1 | 6/2018 | Bourdev et al. |
| 2018/0176570 | A1 | 6/2018 | Rippel et al. |
| 2018/0249158 | A1 | 8/2018 | Huang et al. |
| 2018/0288440 | A1 | 10/2018 | Chao |
| 2018/0293706 | A1 | 10/2018 | Viswanathan et al. |
| 2018/0302456 | A1 | 10/2018 | Katsavounidis et al. |
| 2019/0013822 | A1 | 1/2019 | Marpe et al. |
| 2019/0230354 | A1 | 7/2019 | Kim |
| 2020/0184314 | A1* | 6/2020 | Krishnamoorthy .... G06N 3/088 |
| 2020/0258197 | A1 | 8/2020 | Tai et al. |

FOREIGN PATENT DOCUMENTS

| | | |
|---|---|---|
| JP | 2009-540625 A | 11/2009 |
| JP | 2012-191250 A | 10/2012 |
| KR | 10-0224801 B1 | 10/1999 |
| KR | 10-0286443 B1 | 4/2001 |
| KR | 10-2014-0145560 A | 12/2014 |
| KR | 10-2015-0087103 A | 7/2015 |
| KR | 10-2015-0135637 A | 12/2015 |
| KR | 10-2016-0036662 A | 4/2016 |
| KR | 10-2016-0080929 A | 7/2016 |
| KR | 10-2017-0059040 A | 5/2017 |
| KR | 10-2017-0100045 A | 9/2017 |
| KR | 10-2018-0001428 A | 1/2018 |
| KR | 10-2018-0043154 A | 4/2018 |
| KR | 10-2018-0052651 A | 5/2018 |
| KR | 10-1885855 B1 | 8/2018 |
| KR | 10-2018-0100976 A | 9/2018 |
| KR | 10-2018-0108288 A | 10/2018 |
| WO | 2016/205733 A1 | 12/2016 |
| WO | 2017/036370 A1 | 3/2017 |
| WO | 2018/091486 A1 | 5/2018 |
| WO | 2018/140294 A1 | 8/2018 |
| WO | 2018/140596 A2 | 8/2018 |
| WO | 2018/140596 A3 | 8/2018 |
| WO | 2018/143992 A1 | 8/2018 |
| WO | 2018/170393 A2 | 9/2018 |
| WO | 2018/170393 A3 | 9/2018 |
| WO | 2018/170393 A9 | 9/2018 |

OTHER PUBLICATIONS

Communication dated Jun. 7, 2021, issued by the INDIA Intellectual Property Office in Indian Patent Application No. 201924041670.
Communication dated Jun. 21, 2021, issued by the Korean Patent Office in Korean Patent Application No. 10-2019-0062583.
Communication dated Aug. 9, 2021, issued by the Korean Patent Office in Korean Patent Application No. 10-2019-0062583.
Communication dated Jun. 21, 2021, issued by the Korean Patent Office in Korean Patent Application No. 10-2019-0066057.
Communication dated Aug. 9, 2021, issued by the Korean Patent Office in Korean Patent Application No. 10-2019-0066057.
Communication dated Jun. 29, 2021, issued by the European Patent Office in counterpart European Application No. 19872393.4.
Li et al., "Learning a Convolutional Neural Network for Image Compact-Resolution," IEEE Transactions on Image Processing, vol. 28, No. 3, pp. 1092-1107, Mar. 2019, XP011703593.
Li et al., "Convolutional Neural Network-Based Block Up-Sampling for Intra Frame Coding," IEEE Transactions on Circuitsand Systems for Video Technology, vol. 28, No. 9, pp. 2316-2330, Sep. 2018, XP055610817.
Communication dated Jul. 20, 2021, issued by the European Patent Office in counterpart European Application No. 19874036.7.
Theis et al., "Lossy Image Compression with Compressive Autoencoders," arXiv.1703.00395v1, Mar. 2017, Total 19 pages, XP080753545.
Tao et al., "An End-to-End Compression Framework Based on Convolutional Neural Networks," IEEE, Data Compression Conference, 2017, Total 1 page, XP033095376.
Anonymous, "Machine learning—Why do we need floats for using neural networks?—Artificial Intelligence Stack Exchange," https://ai.stackexchange.com/questions/7247/why-do-we-need-floats-for-using-neural-networks, Aug. 2018, Total 8 pages, XP055822829.
Gupta et al., "Deep Learning with Limited Numerical Precision," arXiv:1502.02551 v1, Feb. 2015, Total 10 pages, XP080677454.
Communication dated Jul. 21, 2021, issued by the Korean Patent Office in counterpart Korean Patent Application No. 10-2019-0077250.
Communication dated Jul. 5, 2021, issued by the European Patent Office in counterpart European Application No. 19873269.5.
Communication dated Jul. 21, 2021, issued by the Korean Patent Office in counterpart Korean Patent Application No. 10-2019-0076569.
Communication dated Jun. 29, 2021, issued by the European Patent Office in counterpart European Application No. 19873762.9.
Communication dated Feb. 21, 2022 issued by Korean Patent Office in counterpart Korean Application No. 10-2019-0041109.
Communication dated Feb. 21, 2022 by the Korean Patent Office in counterpart Korean Application No. 10-2019-0066057.
Communication dated Jan. 23, 2020 issued by the International Searching Authority in counterpart Application No. PCT/KR2019/012836 (PCT/ISA/220, PCT/ISA/210, and PCT/ISA/237).
Communication dated Dec. 11, 2020 issued by the Korean Intellectual Property Office in counterpart Korean Application No. 10-2019-0041109.
Communication dated Dec. 4, 2019 issued by the International Searching Authority in counterpart Application No. PCT/KR2019/010645 (PCT/ISA/220, PCT/ISA/210, and PCT/ISA/237).
Communication dated Aug. 6, 2019 December issued by the International Searching Authority in counterpart Application No. PCT/KR2019/004171 (PCT/ISA/220, PCT/ISA/210, and PCT/ISA/237).
Communication dated Dec. 16, 2020 issued by the Korean Intellectual Property Office in counterpart Korean Application No. 10-2019-0062583.
Seunghyun Cho et al., "A Technical Analysis on Deep Learning based Image and Video Compression", Journal of Broadcast Engineering Society, vol. 23, No. 3, May 2018, pp. 383-394, 12 pages total.
Nick Johnston et al., "Improved Lossy Image Compression with Priming and Spatially Adaptive Bit Rates for Recurrent Networks", Cornell University, Mar. 29, 2017, 9 pages total.
Communication dated Jan. 30, 2020 issued by the International Searching Authority in counterpart Application No. PCT/KR2019/013421 (PCT/ISA/220, PCT/ISA/210, and PCT/ISA/237).
Communication dated Dec. 22, 2020 issued by the Korean Intellectual Property Office in counterpart Korean Application No. 10-2019-0066057.

(56) References Cited

OTHER PUBLICATIONS

Communication dated Feb. 5, 2020 issued by the International Searching Authority in counterpart Application No. PCT/KR2019/013483 (PCT/ISA/220, PCT/ISA/210, and PCT/ISA/237).
Communication dated Jan. 12, 2021 issued by the Korean Intellectual Property Office in counterpart Korean Application No. 10-2019-0078343.
Communication dated Jan. 29, 2020 issued by the International Searching Authority in counterpart Application No. PCT/KR2019/013595 (PCT/ISA/220, PCT/ISA/210, and PCT/ISA/237).
Communication dated Jan. 13, 2021 issued by the Korean Intellectual Property Office in counterpart Korean Application No. 10-2019-0078344.
Communication dated Feb. 21, 2020 issued by the International Searching Authority in counterpart Application No. PCT/KR2019/013733 (PCT/ISA/220, PCT/ISA/210, and PCT/ISA/237).
Communication dated Jan. 6, 2021 issued by the Korean Intellectual Property Office in counterpart Korean Application No. 10-2019-0077250.
Communication dated Jan. 22, 2020 issued by the International Searching Authority in counterpart Application No. PCT/KR2019/013344 (PCT/ISA/220, PCT/ISA/210, and PCT/ISA/237).
Communication dated Jan. 5, 2021 issued by the Korean Intellectual Property Office in counterpart Korean Application No. 10-2019-0076569.
Communication dated Jan. 7, 2020 issued by the International Searching Authority in counterpart Application No. PCT/KR2019/012510 (PCT/ISA/220, PCT/ISA/210, and PCT/ISA/237).
Communication dated Jun. 3, 2021 issued by the Korean Intellectual Property Office in counterpart Korean Application No. 10-2019-0041102.
Communication dated Dec. 10, 2020 issued by the Korean Intellectual Property Office in counterpart Korean Application No. 10-2019-0041102.
Seungbin Lee et al., "Performance Analysis of Convolution Neural Network and Generative Adversarial Network for Super Resolution", The Korean Institute of Information Scientists and Engineers, Jun. 2017, pp. 931-933, 6 pages total.
Woojin Jeong et al., "Efficient Super-Resolution Method for Single Image based on Deep Neural Networks", Journal of the Institute of Electronics and Information Engineers, vol. 55, No. 6, Jun. 2018, 23 pages total.
Feng Jiang et al., "An End-to-End Compression Framework Based on Convolutional Neural Networks", IEEE Transactions on Circuits and Systems for Video Technology, Aug. 2, 2017, pp. 1-13, 13 pages total.
Christos Louizos et al., "Relaxed Quantization for Discretized Neural Networks", arXiv, Oct. 3, 2018, 14 pages total.
Sergey Ioffe et al., "Batch Normalization: Accelerating Deep Network Training by Reducing Internal Covariate Shift", arXiv, Mar. 2, 2015, pp. 1-11, 11 pages total.
Jiwon Kim et al., "Deeply-Recursive Convolutional Network for Image Super-Resolution", arXiv, Nov. 11, 2016, pp. 9 pages total.
Sergey Ioffe et al., "Batch Normalization: Accelerating Deep Network Training by Reducing Internal Covariate Shift", Proceedings of the 32nd International Conference on Machine Learning, 2015, pp. 1-11, 11 pages total.
Suo Qiu et al., "FReLU: Flexible Rectified Linear Units for Improving Convolutional Neural Networks", arXiv, Jan. 29, 2018, 6 pages total.
Sehwan Ki et al., "A Study on the Convolution Neural Network based on Blind High Dynamic Range Image Quality Assessment", Proceedings of Symposium of the Korean Institute of communications and Information Sciences, Korea Institute of Communication Sciences, Jan. 2018, 4 pages total.
Patrick Le Callet et al., "A Convolutional Neural Network Approach for Objective Video Quality Assessment", IEEE Transactions on Neural Networks, vol. 17, No. 5, Sep. 6, 2006, 14 pages total.
Michalis Giannopoulos et al., "Convolutional Neural Networks for Video Quality Assessment", arXiv e-prints, Sep. 26, 2018, 14 pages total.
Woon-Sung Park et al., "CNN-Based in-Loop Filtering for Coding Efficiency Improvement", IEEE, 2016, 5 pages total.
Yuanying Dai et al., "A Convolutional Neural Network Approach for Post-Processing in HEVC Intra Coding", arXiv, Oct. 29, 2016, 12 pages total.
Mohammad Rastegari et al., "XNOR-Net: ImageNet Classification Using Binary Convolutional Neural Networks", Aug. 2, 2016, 17 pages total.
Matthieu Courbariaux et al., "BinaryConnect: Training Deep Neural Networks with binary weights during propagations", arXiv, Apr. 18, 2016, 9 pages total.
Notice of Amendment Dismissal Communication dated Dec. 17, 2021 issued by the Korean Patent Office in counterpart Korean Application No. 10-2019-0041109.
Communication dated Nov. 8, 2021 issued by the Korean Patent Office in counterpart Korean Application No. 10-2021-0119183.
Notice of Final Rejection Communication dated Dec. 17, 2021 issued by the Korean Patent Office in counterpart Korean Application No. 10-2019-0041109.
Communication dated Oct. 4, 2021 issued by the European Intellectual Property Office in counterpart European Application No. 19873223.2.
Mehdi S. M. Sajjadi et al., "EnhanceNet: Single Image Super-Resolution Through Automated Texture Synthesis", IEEE International Conference on Computer Vision, 2017, 10 pages total, XP033283324.
Tiantong Guo et al., "Deep Learning Based Image Super-Resolution With Coupled Backpropagation", IEEE, 2016, 5 pages total, XP033087061.
Communication dated May 24, 2022, issued by the Korean Intellectual Property Office in Korean Patent English Application No. 10-2021-0119183.
Sun et al., "Pyramid Embedded Generative Adversarial Network for Automated Font Generation", 2018, International Conference on Pattern Recognition (ICPR), 6 pages total, XP033457235.
Yasrab, et al., "SCNet: A Simplified Encoder-Decoder CNN for Semantic Segmentation", 2016, 5th International Conference on Computer Science and Network Technology (ICCSNT), 5 pages total, XP033227705.
"High Efficiency Video coding", 2013, Series H: Audiovisual and Multimedia Systems, H.265(Apr. 2013), ITU-T, 317 pages total.
Communication dated Sep. 29, 2022 by the European Patent Office for European Patent Application No. 19873871.8.
Communication dated Oct. 5, 2022 by the European Patent Office for European Patent Application No. 19873877.5.
Communication dated Oct. 17, 2022 by the European Patent Office for European Patent Application No. 19872933.7.
Communication dated Sep. 22, 2022 by the Korean Patent Office for Korean Patent Application No. 10-2019-0062583.
Communication dated Aug. 29, 2022 by the Korean Patent Office for Korean Patent Application No. 10-2019-0062583.
Communication dated Sep. 22, 2022 by the Korean Patent Office for Korean Patent Application No. 10-2019-0077250.
Communication dated Aug. 29, 2022 by the Korean Patent Office for Korean Patent Application No. 10-2019-0077250.
Communication dated Sep. 22, 2022 by the Korean Patent Office for Korean Patent Application No. 10-2019-0076569.
Communication dated Aug. 29, 2022 by the Korean Patent Office for Korean Patent Application No. 10-2019-0076569.
Communication dated Jan. 20, 2023, issued by the Korean Intellectual Property Office in Korean Patent Application No. 10-2019-0062583.
Communication dated Dec. 23, 2022, issued by the India Intellectual Property Office in Indian Patent Application No. 202117016596.
Communication dated Dec. 28, 2022, issued by the India Intellectual Property Office in Indian Patent Application No. 202117018613.
Communication dated Dec. 28, 2022, issued by the India Intellectual Property Office in Indian Patent Application No. 202117019847.

(56) References Cited

OTHER PUBLICATIONS

Communication dated Jan. 20, 2023, issued by the Korean Intellectual Property Office in Korean Patent Application No. 10-2019-0077250.
Communication dated Jan. 20, 2023, issued by the Korean Intellectual Property Office in Korean Patent Application No. 10-2019-0076569.
Communication dated Dec. 22, 2022, issued by the India Intellectual Property Office in Indian Patent Application No. 202117018001.
Communication dated Jan. 4, 2023, issued by the India Intellectual Property Office in Indian Patent Application No. 202117022187.
Communication dated Dec. 26, 2022, issued by the India Intellectual Property Office in Indian Patent Application No. 202117021685.

* cited by examiner

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

METHOD AND DEVICE FOR EVALUATING SUBJECTIVE QUALITY OF VIDEO

TECHNICAL FIELD

The present disclosure relates to a method and device for evaluating a subjective quality of video, and more particularly, to a method and device for evaluating a subjective quality of video by using a video quality assessment network, and a method and apparatus for encoding an image and a method and apparatus for decoding an image by applying the video quality assessment network to a deep neural network for transforming a scale.

BACKGROUND ART

An image is encoded by a codec following a designated data compression standard, e.g., a moving picture expert group (MPEG) compression standard, and is then stored in a recording medium or transmitted via a communication channel, in the form of a bitstream.

As hardware for reproducing and storing high-resolution/high-quality images is being developed and supplied, a need for a codec capable of effectively encoding and decoding high-resolution/high-quality images is increasing.

DESCRIPTION OF EMBODIMENTS

Technical Problem

Because a just noticeable difference (JND) perceived by a person, namely, a degree to which a person feels that a video quality is different, is different for each content, it is important to transmit a minimum amount of information while maintaining the same perceived quality of video. To this end, in the field of image encoding/decoding that requires evaluation of a video quality, a method of modeling and approximating a human's visual system requires an excessively long time, and thus a method and device for evaluating the quality of video, in which a human's visual system is trained using a video quality data set obtained from a video quality assessment network (VQANet) and a VQANet saved in a time period required by training by using a block based on information of time dimension is used.

Solution to Problem

According to an aspect of the present disclosure, a method of evaluating the quality of an image includes obtaining blocks each having a predetermined size by splitting a target image for evaluating a quality and a reference image that is to be compared with the target image; determining sensitivity information and quality assessment information of each of the blocks by inputting the blocks to a video quality assessment network; and determining a final image quality assessment score of the target image by combining the pieces of quality assessment information of the blocks with each other, based on the pieces of sensitivity information of the blocks.

According to an aspect of the present disclosure, an image decoding method includes receiving image data related to a first image obtained via AI downscaling through a downscaling deep neural network (DNN); obtaining a second image corresponding to the first image, based on the image data; and obtaining a third image by AI-upscaling the second image through an upscaling DNN, wherein the upscaling DNN is trained based on image quality assessment loss information obtained as a result of video quality assessment of a first training image output by the upscaling DNN with respect to an original training image.

According to an aspect of the present disclosure, an image encoding method includes inputting an original image to a downscaling DNN; and encoding a first image obtained by AI-downscaling the original image through the downscaling DNN, wherein the downscaling DNN is trained based on first loss information corresponding to a result of comparing a quality-enhanced image selected from a plurality of quality-enhanced images through a video quality assessment with a first training image output by the downscaling DNN, wherein the plurality of quality-enhanced images are obtained by performing a plurality of enhancement methods on a reduced training image corresponding to an original training image.

According to an aspect of the present disclosure, an apparatus for evaluating the quality of a target image includes a memory storing one or more instructions; and a processor configured to execute the at least one instruction stored in the memory, wherein the processor is configured to obtain blocks each having a predetermined size by splitting a target image for evaluating a quality and a reference image that is to be compared with the target image, determine sensitivity information and quality assessment information of each of the blocks by inputting the blocks to a video quality assessment network, and determine a final image quality assessment score of the target image by combining the pieces of quality assessment information of the blocks with each other, based on the pieces of sensitivity information of the blocks.

According to an aspect of the present disclosure, an image decoding apparatus includes a memory storing one or more instructions; and a processor configured to execute the at least one instruction stored in the memory, wherein the processor is configured to receive image data related to a first image obtained via AI downscaling through a downscaling DNN, obtain a second image corresponding to the first image, based on the image data, and obtain a third image by AI-upscaling the second image through an upscaling DNN, wherein the upscaling DNN is trained based on image quality assessment loss information obtained as a result of video quality assessment of a first training image output by the upscaling DNN with respect to an original training image.

According to an aspect of the present disclosure, an image encoding apparatus includes a memory storing one or more instructions; and a processor configured to execute the at least one instruction stored in the memory, wherein the processor is configured to input an original image to a downscaling DNN, and encode a first image obtained by AI-downscaling the original image by using the downscaling DNN, and the downscaling DNN is trained based on first loss information corresponding to a result of comparing a quality-enhanced image selected from a plurality of quality-enhanced images through a video quality assessment with a first training image output by the downscaling DNN, wherein the plurality of quality-enhanced images are obtained by performing a plurality of enhancement methods on a reduced training image corresponding to an original training image.

Advantageous Effects of Disclosure

A subjective video quality of a target image for quality evaluation is evaluated based on deep learning by determining a final image quality assessment score of the target image by using sensitivity information and quality assessment information determined by inputting, to a video quality network, blocks into which the target image and a reference image to be compared with the target image are split. In addition, provided is a deep neural network of transforming a scale in which subjective video quality evaluation has been reflected, by applying the video quality network to the deep neural network.

BRIEF DESCRIPTION OF DRAWINGS

A brief description of each drawing is provided to better understand the drawings cited herein.

BEST MODE

Figure 1:
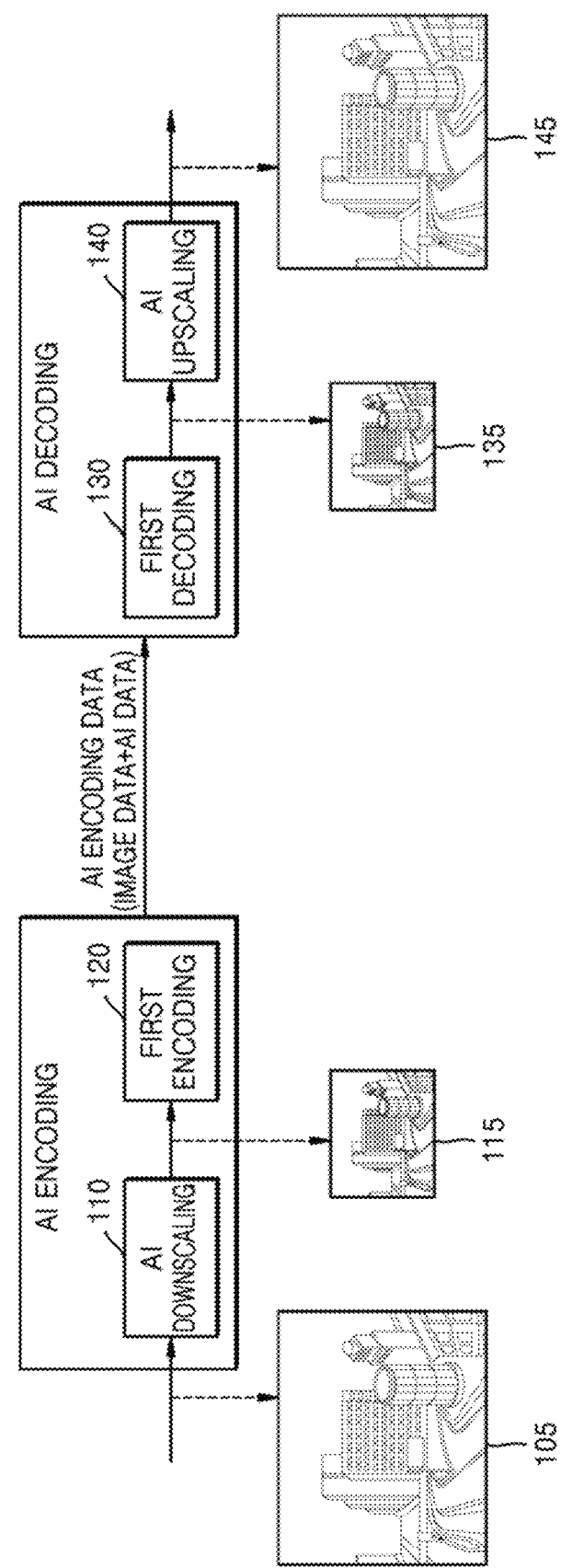
FIG. 1 is a diagram for describing an artificial intelligence (AI) encoding process and an AI decoding process, according to an embodiment of the disclosure.

According to an aspect of the present disclosure, a method of evaluating the quality of an image includes obtaining blocks each having a predetermined size by splitting a target image for evaluating a quality and a reference image that is to be compared with the target image; determining sensitivity information and quality assessment information of each of the blocks by inputting the blocks to a video quality assessment network; and determining a final image quality assessment score of the target image by combining the pieces of quality assessment information of the blocks with each other, based on the pieces of sensitivity information of the blocks.

According to an embodiment, the video quality assessment network may determine the sensitivity information of each of the blocks of the target image and the reference image by inputting the blocks to a convolutional neural network, and may determine the quality assessment information of each of the blocks of the target image and the reference image by inputting the blocks to a capsule neural network.

According to an embodiment, the sensitivity information may be used as a weight of each of the blocks, the quality assessment information may include a mean opinion score (MOS) average of each of the blocks, the final image quality assessment score may be determined by a weighted average of the MOS average based on the weight, and the MOS may be a value representing a user's subjective perceived quality.

According to an embodiment, the video quality assessment network may determine respective pieces of sensitivity information of blocks of a target training image and a reference training image by inputting the blocks to a convolutional neural network, may determine respective MOS averages and respective MOS standard deviations of the blocks of the target training image and the reference training image by inputting the blocks to a capsule neural network, and may be trained using the respective pieces of sensitivity information, the respective MOS averages, and the respective MOS standard deviations.

According to an embodiment, the video quality assessment network may determine respective pieces of sensitivity information of blocks of a target training image and a reference training image by inputting the blocks to a convolutional neural network, may determine full reference quality assessment information of each of the blocks of the target training image and the reference training image by inputting the blocks to a capsule neural network, may determine non-reference quality assessment information of each of the blocks of the target training image by inputting the blocks to the capsule neural network, and may be trained using the respective pieces of sensitivity information, the full reference quality assessment information, and the non-reference quality assessment information.

According to an embodiment, the full reference quality assessment information may include full reference MOS averages and full reference MOS standard deviations of the blocks of the target training image and the reference training image, the non-reference quality assessment information may include non-reference MOS averages and non-reference MOS standard deviations of the blocks of the target training image, and the MOS may be a value representing a user's subjective perceived quality.

According to an embodiment, the predetermined size may be txbxbxc, where t indicates the number of frames, b indicates a horizontal or vertical size, and c indicates the number of color channels.

According to an embodiment, the quality assessment information may include a MOS average and a MOS standard deviation of each of the blocks, the sensitivity information may be used as a weight of each of the blocks, the final image quality assessment score may be determined by a weighted average of the MOS average based on the weight and a weighted average of the MOS standard deviation based on the weight, and the MOS may be a value representing a user's subjective perceived quality.

According to an aspect of the present disclosure, an image decoding method includes receiving image data related to a first image obtained via AI downscaling through a downscaling deep neural network (DNN); obtaining a second image corresponding to the first image, based on the image data; and obtaining a third image by AI-upscaling the second image through an upscaling DNN, wherein the upscaling DNN is trained based on image quality assessment loss information obtained as a result of video quality assessment of a first training image output by the upscaling DNN with respect to an original training image.

According to an embodiment, the image quality assessment loss information may be determined by a video quality assessment score of the first training image that is determined by obtaining blocks each having a predetermined size by splitting the first training image for quality evaluation and an original training image to be compared with the first training image, determining sensitivity information and quality assessment information of each of the blocks by inputting the blocks to a video quality assessment network, and combining the pieces of quality assessment information with each other, based on the pieces of sensitivity information.

According to an embodiment, the video quality assessment network may determine the sensitivity information of each of the blocks of the first training image and the original training image by inputting the blocks to a convolutional neural network, and may determine the quality assessment information of each of the blocks of the first training image and the original training image by inputting the blocks to a capsule neural network.

According to an aspect of the present disclosure, an image encoding method includes inputting an original image to a downscaling DNN; and encoding a first image obtained by AI-downscaling the original image through the downscaling DNN, wherein the downscaling DNN is trained based on first loss information corresponding to a result of comparing a quality-enhanced image selected from a plurality of quality-enhanced images through a video quality assessment with a first training image output by the downscaling DNN, wherein the plurality of quality-enhanced images are obtained by performing a plurality of enhancement methods on a reduced training image corresponding to an original training image.

According to an embodiment, the selected quality-enhanced image is a quality-enhanced image having a highest video quality assessment score as a result of determining a plurality of quality-enhanced images by applying a plurality of pre-determined enhancement methods to a reduced training image determined by reducing the original training image according to a structural feature of the original training image, obtaining blocks each having a predetermined size by splitting the plurality of quality-enhanced images and the reduced training image, determining respective pieces of sensitivity information and respective pieces of quality assessment information of the blocks by inputting the blocks to a video quality assessment network, determining respective video quality assessment scores of the plurality of quality-enhanced images, based on the respective pieces of sensitivity information and the respective pieces of quality assessment information, and comparing the video quality assessment scores of the plurality of quality-enhanced images.

According to an embodiment, the video quality assessment network may determine the sensitivity information of each of the blocks of the plurality of quality-enhanced images and the reduced training image by inputting the blocks to a convolutional neural network, and may determine the quality assessment information of each of the blocks of the plurality of quality-enhanced images and the reduced training image by inputting the blocks to a capsule neural network.

According to an aspect of the present disclosure, an apparatus for evaluating the quality of a target image includes a memory storing one or more instructions; and a processor configured to execute the at least one instruction stored in the memory, wherein the processor is configured to obtain blocks each having a predetermined size by splitting a target image for evaluating a quality and a reference image that is to be compared with the target image, determine sensitivity information and quality assessment information of each of the blocks by inputting the blocks to a video quality assessment network, and determine a final image quality assessment score of the target image by combining the pieces of quality assessment information of the blocks with each other, based on the pieces of sensitivity information of the blocks.

According to an aspect of the present disclosure, an image decoding apparatus includes a memory storing one or more instructions; and a processor configured to execute the at least one instruction stored in the memory, wherein the processor is configured to receive image data related to a first image obtained via AI downscaling through a downscaling DNN, obtain a second image corresponding to the first image, based on the image data, and obtain a third image by AI-upscaling the second image through an upscaling DNN, wherein the upscaling DNN is trained based on image quality assessment loss information obtained as a result of video quality assessment of a first training image output by the upscaling DNN with respect to an original training image.

According to an aspect of the present disclosure, an image encoding apparatus includes a memory storing one or more instructions; and a processor configured to execute the at least one instruction stored in the memory, wherein the processor is configured to input an original image to a downscaling DNN, and encode a first image obtained by AI-downscaling the original image by using the downscaling DNN, and the downscaling DNN is trained based on first loss information corresponding to a result of comparing a quality-enhanced image selected from a plurality of quality-enhanced images through a video quality assessment with a first training image output by the downscaling DNN, wherein the plurality of quality-enhanced images are obtained by performing a plurality of enhancement methods on a reduced training image corresponding to an original training image.

MODE OF DISCLOSURE

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) downscaling an image, and a 'second DNN' indicates a DNN used for AI upscaling an image.

Also, in the present specification, 'DNN setting information' includes the parameter described above as information related to the element constituting the DNN. The first DNN or the second DNN may be set by using the DNN setting information.

Also, in the present specification, an 'original image' denotes an image that is an object of AI encoding, and a 'first image' denotes an image obtained as a result of performing AI downscaling on the original image during an AI encoding process. A 'second image' denotes an image obtained via first decoding during an AI decoding process, and a 'third image' denotes an image obtained by AI upscaling the second image during the AI decoding process.

Also, in the present specification, 'AI downscale' denotes a process of decreasing resolution of an image, based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image, based on AI.

FIG. 1 is a diagram for describing an AI encoding process and an AI decoding process, according to an embodiment of the disclosure.

As described above, when resolution of an image remarkably increases, the throughput of information for encoding/decoding the image is increased, and accordingly, a method for improving efficiency of encoding and decoding of an image is required.

As shown in FIG. 1, according to an embodiment of the disclosure, a first image 115 is obtained by performing AI downscaling 110 on an original image 105 having high resolution. Then, first encoding 120 and first decoding 130 are performed on the first image 115 having relatively low resolution, and thus a bitrate that is processed may be largely reduced compared to when the first encoding 120 and the first decoding 130 are performed on the original image 105.

In detail, referring to FIG. 1, the first image 115 is obtained by performing the AI downscaling 110 on the original image 105 and the first encoding 120 is performed on the first image 115, during the AI encoding process, according to an embodiment. During the AI decoding process, AI encoding data including AI data and image data, which are obtained as a result of AI encoding, is received, a second image 135 is obtained via the first decoding 130, and a third image 145 is obtained by performing AI upscaling 140 on the second image 135.

Referring to the AI encoding process in detail, when the original image 105 is received, the AI downscaling 110 is performed on the original image 105 to obtain the first image 115 of certain resolution or certain quality. The AI downscaling 110 is performed based on AI, and AI for the AI downscaling 110 needs to be trained jointly with AI for the AI upscaling 140 with respect to the second image 135. This is because, when the AI for the AI downscaling 110 and the AI for the AI upscaling 140 are separately trained, a difference between the original image 105, which is an object of AI encoding, and the third image 145 reconstructed through AI decoding is increased.

According to an embodiment of the disclosure, the AI data may be used to maintain such a joint relationship during the AI encoding process and the AI decoding process. Accordingly, the AI data obtained through the AI encoding process needs to include information indicating an upscaling target, and during the AI decoding process, the AI upscaling 140 needs to be performed on the third image 135 according to the upscaling target verified based on the AI data.

The AI for the AI downscaling 110 and the AI for the AI upscaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI upscaling 140 on the second image 135 to target resolution based on the received target information.

Regarding the first encoding 120 and the first decoding 130 of FIG. 1, information amount of the first image 115 obtained by performing the AI downscaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of the image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI downscaling 110 of the original image 105. The image data may be used during the first decoding 130 and the AI data may be used during the AI upscaling 140.

The image data may be transmitted in a form of a bitstream. The image data may include data obtained based on pixel values in the first image 115, for example, residual data that is a difference between the first image 115 and prediction data of the first image 115. Also, the image data includes pieces of information used during the first encoding 120 on the first image 115. For example, the image data may include prediction mode information, motion information, and quantization parameter-related information used during the first encoding 120. The image data may be generated according to a rule, for example, a syntax, of an image compression method used during the first encoding 120, from among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI upscaling 140 to be performed accurately on the second image 135 through the second DNN. During the AI decoding process, the AI upscaling 140 may be performed on the second image 135 to have targeted resolution and/or quality, based on the AI data.

The AI data may be transmitted together with the image data in the form of a bitstream. Alternatively, according to an embodiment, the AI data may be transmitted separately from the image data, in the form of a frame or a packet. The AI data and the image data obtained as a result of the AI encoding may be transmitted through the same network or through different networks.

Figure 2:
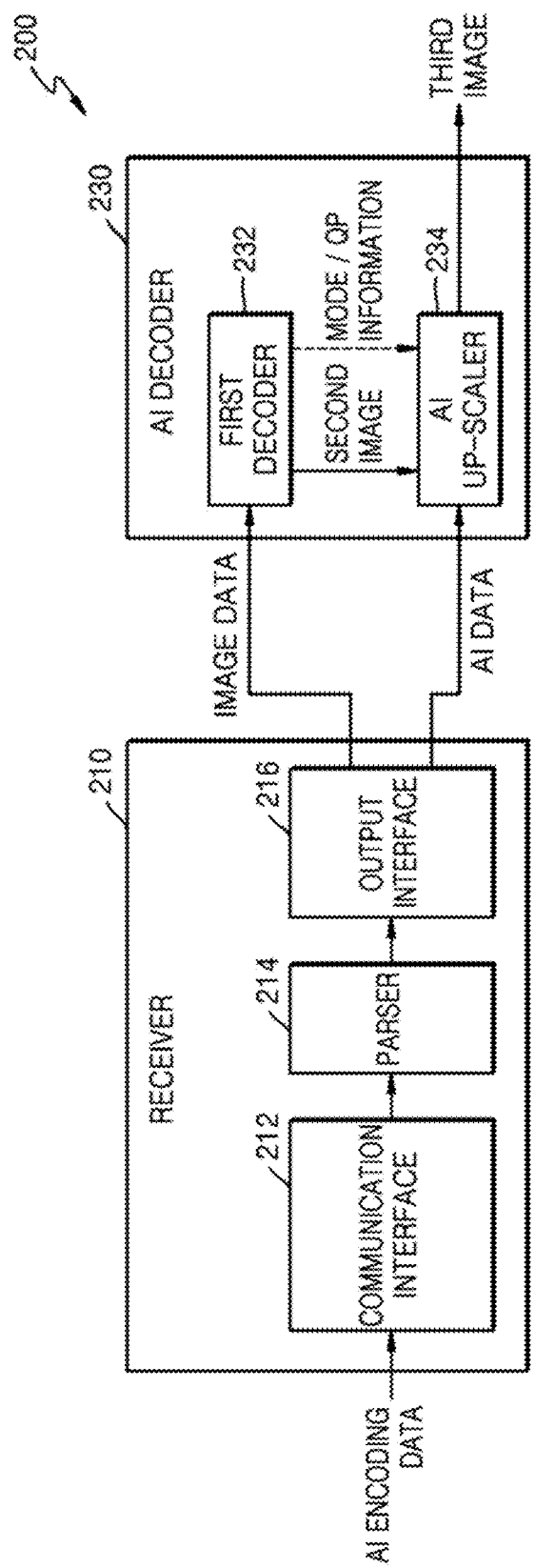
FIG. 2 is a block diagram of a structure of an AI decoding apparatus according to an embodiment of the disclosure.

FIG. 2 is a block diagram of a configuration of an AI decoding apparatus 200 according to an embodiment of the disclosure.

Referring to FIG. 2, the AI decoding apparatus 200 may include a receiver 210 and an AI decoder 230. The receiver 210 may include a communication interface 212, a parser 214, and an output interface 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In detail, the communication interface 212 receives the AI encoding data obtained as the result of AI encoding through a network. The AI encoding data obtained as the result of AI encoding includes the image data and the AI data. The image data and the AI data may be received through a same type of network or different types of networks.

The parser 214 receives the AI encoding data through the communication interface 212 and parses the AI encoding data to distinguish the image data and the AI data. For example, the parser 214 may read a header of data obtained from the communication interface 212 to determine whether the data is the image data or the AI data. According to an embodiment, the parser 214 distinguishably transmits the image data and the AI data to the output interface 216 via the header of the data received through the communication interface 212, and the output interface 216 transmits the image data and the AI data respectively to the first decoder 232 and the AI up-scaler 234. At this time, the parser 214 may verify that the image data included in the AI encoding data is image data obtained via a certain codec (for example, MPEG-2, H.264 AVC, MPEG-4, HEVC, VC-1, VP8, VP9, or AV1). In this case, the parser 214 may transmit corresponding information to the first decoder 232 through the receiver 216 such that the image data is processed via the verified codec.

According to an embodiment, the AI encoding data parsed by the parser 214 may be obtained from a data storage medium including a magnetic medium (such as a hard disk, a floppy disk, or a magnetic tape), an optical recording medium (such as CD-ROM or DVD), or a magneto-optical medium (such as a floptical disk).

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be provided to the AI up-scaler 234.

In response to the AI data, the AI up-scaler 234 performs AI up-scaling on the second image 135, based on the AI data. According to an embodiment, the AI up-scaler 234 may perform the AI up-scaling by further using the first decoding related information, such as the prediction mode information, the quantization parameter information, or the like included in the image data.

The receiver 210 and the AI decoder 230 according to an embodiment have been described above as individual devices, but may be implemented through one processor. In this case, the receiver 210 and the AI decoder 230 may be implemented through a dedicated processor or through a combination of software and a general-purpose processor such as an application processor (AP), a central processing unit (CPU), or a graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and a plurality of general-purpose processors such as an AP, a CPU, or a GPU. Similarly, the AI down-scaler 234 and the first encoder 232 may be implemented through different processors.

The AI data provided to the AI up-scaler 234 includes pieces of information enabling the second image 135 to undergo AI upscaling. Here, the upscaling target needs to correspond to downscaling of a first DNN. Accordingly, the AI data needs to include information for verifying the downscaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is ascertained through the resolution of the reconstructed second image 135 and the resolution conversion degree is verified accordingly, the difference information may be expressed only as resolution information of the original image 105. Here, the resolution information may be expressed as vertical/horizontal screen sizes or as a ratio (16:9, 4:3, or the like) and a size of one axis. Also, when there is pre-set resolution information, the resolution information may be expressed in the form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The upscaling target may indicate, for example, to what degree resolution is to be upscaled for the second image 135. When the upscaling target is determined, the AI up-scaler 234 performs AI upscaling on the second image 135 through a second DNN in order to obtain the third image 145 corresponding to the upscaling target.

Before describing a method, performed by the AI up-scaler 234, of performing AI upscaling on the second image 135 according to the upscaling target, an AI upscaling process through the second DNN will be described with reference to FIGS. 3 and 4.

Figure 3:
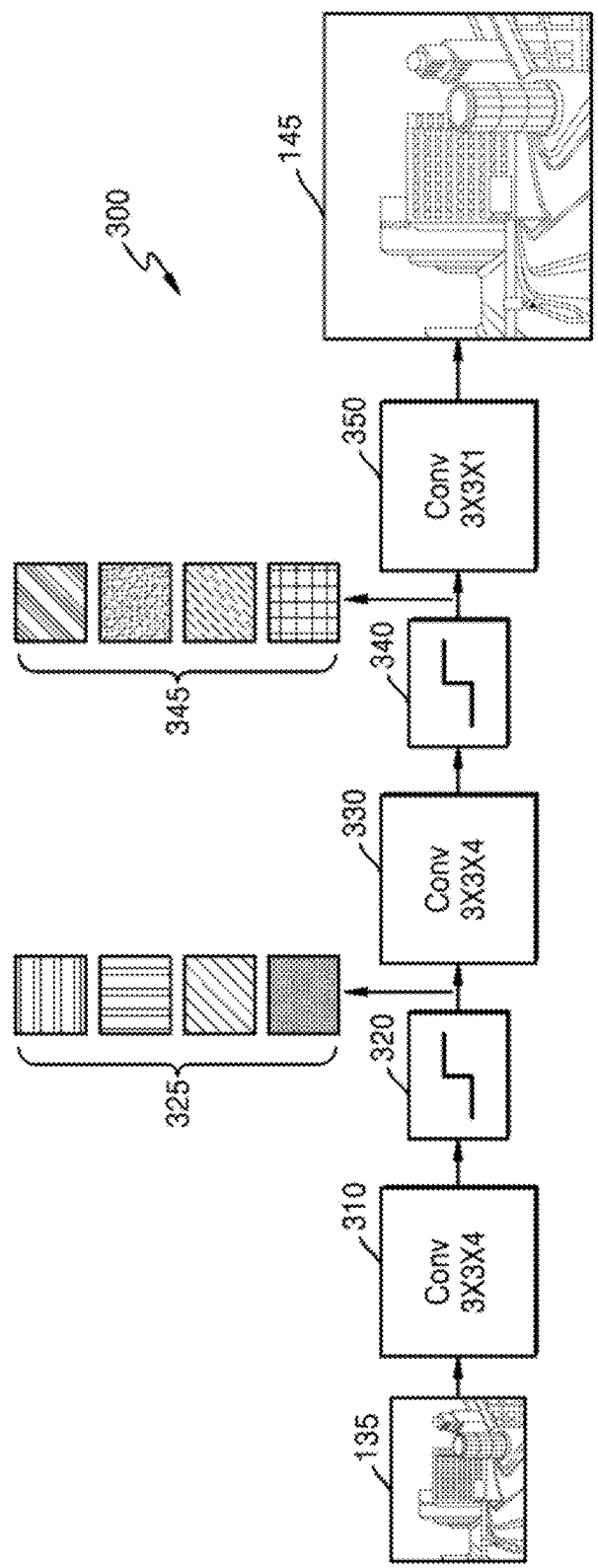
FIG. 3 is a diagram showing a second deep neural network (DNN) for performing AI upscaling on a second image.
Figures 4, 5:
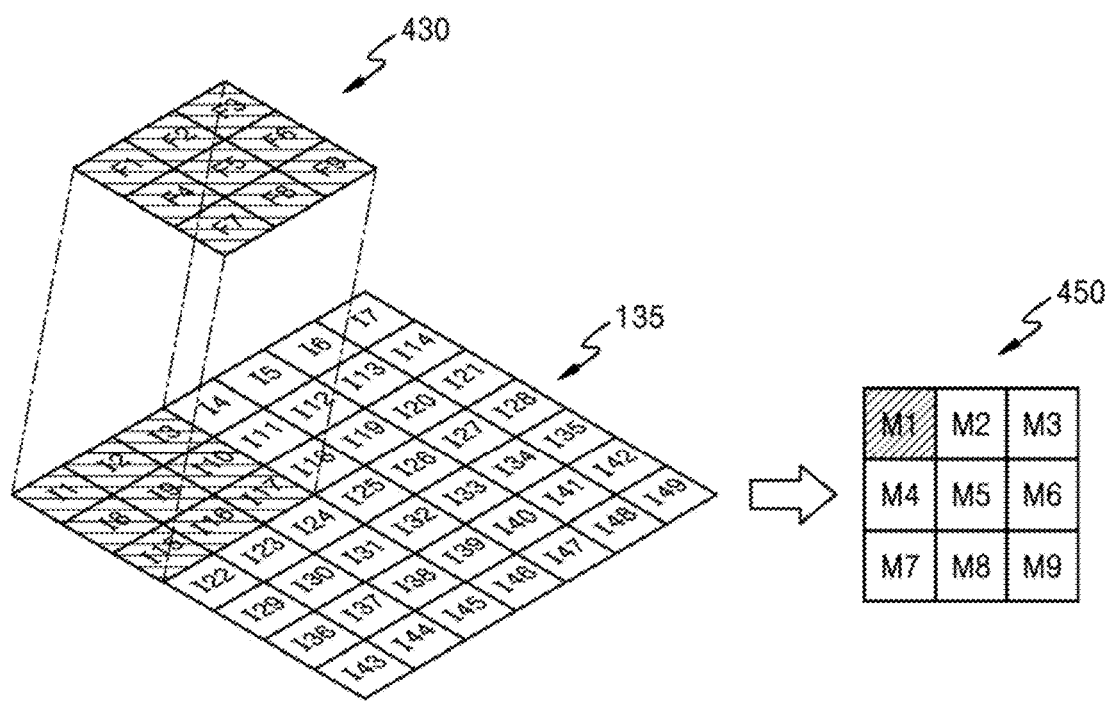
FIG. 4 is a diagram for describing a convolution operation in a convolution layer.
FIG. 5 is a table showing a mapping relationship between several pieces of image-related information and several pieces of DNN setting information.

FIG. 3 is a diagram showing a second DNN 300 for performing AI upscaling on the second image 135, and FIG. 4 is a diagram illustrating a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example. When the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplications may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplications may be assigned as a value of M2 of the feature map 450.

While the filter kernel 430 is moving along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an upscaling target corresponding to a downscaling target of the first DNN, based on AI data, and determine parameters corresponding to the determined upscaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example, and embodiments of the disclosure are not limited thereto.

Referring back to FIG. 3, the feature maps output from the first convolution layer 310 may be input to a first activation layer 320.

The first activation layer 320 may assign a non-linear feature to each feature map. The first activation layer 320 may include, but is not limited to, a sigmoid function, a Tanh function, a rectified linear unit (ReLU) function, or the like.

The first activation layer 320 assigning the non-linear feature indicates changing and outputting some sample values of the feature map, which is an output of the first convolution layer 310. Here, the changing is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image, and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, parameters of the filter kernels of the first, second, and third convolution layers 310, 330, and 350 of the second DNN 300, and the like, as will be described later, and the plurality of pieces of DNN setting information need to be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers, namely, the first, second, and third convolution layers 310, 330, and 350, and two activation layers, namely, the first and second activation layers 320 and 340, but this is only an example. According to an embodiment, the numbers of convolution layers and activation layers may vary. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result with a certain value to determine whether to transmit the input sample value to a next layer.

A method, performed by the AI up-scaler 234, of performing the AI upscaling on the second image 135 according to the upscaling target will now be described.

According to an embodiment, the AI up-scaler 234 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various upscaling targets, and the second DNN may operate based on DNN setting information corresponding to a certain upscaling target. The second DNN may have different structures based on the DNN setting information. For example, the second DNN may include three convolution layers according to any piece of DNN setting information, or may include four convolution layers according to another piece of DNN setting information.

According to an embodiment, the DNN setting information may only include a parameter of a filter kernel used in the second DNN. In this case, instead that the structure of the second DNN does not change, only the parameter of the internal filter kernel may change based on the DNN setting information.

The AI up-scaler 234 may obtain the DNN setting information for performing AI upscaling on the second image 135, among the plurality of pieces of DNN setting information. Each of the plurality of pieces of DNN setting information used at this time is information for obtaining the third image 145 of a pre-determined resolution and/or pre-determined quality, and is trained jointly with a first DNN.

For example, one piece of DNN setting information among the plurality of pieces of DNN setting information may include pieces of information for obtaining the third image 145 of resolution twice higher than resolution of the second image 135, for example, the third image 145 of 4 K (4096×2160) twice higher than 2 K (2048×1080) of the second image 135, and another piece of DNN setting information may include pieces of information for obtaining the third image 145 of resolution four times higher than the resolution of the second image 135, for example, the third image 145 of 8 K (8192×4320) four times higher than 2 K (2048×1080) of the second image 135.

Figure 7:
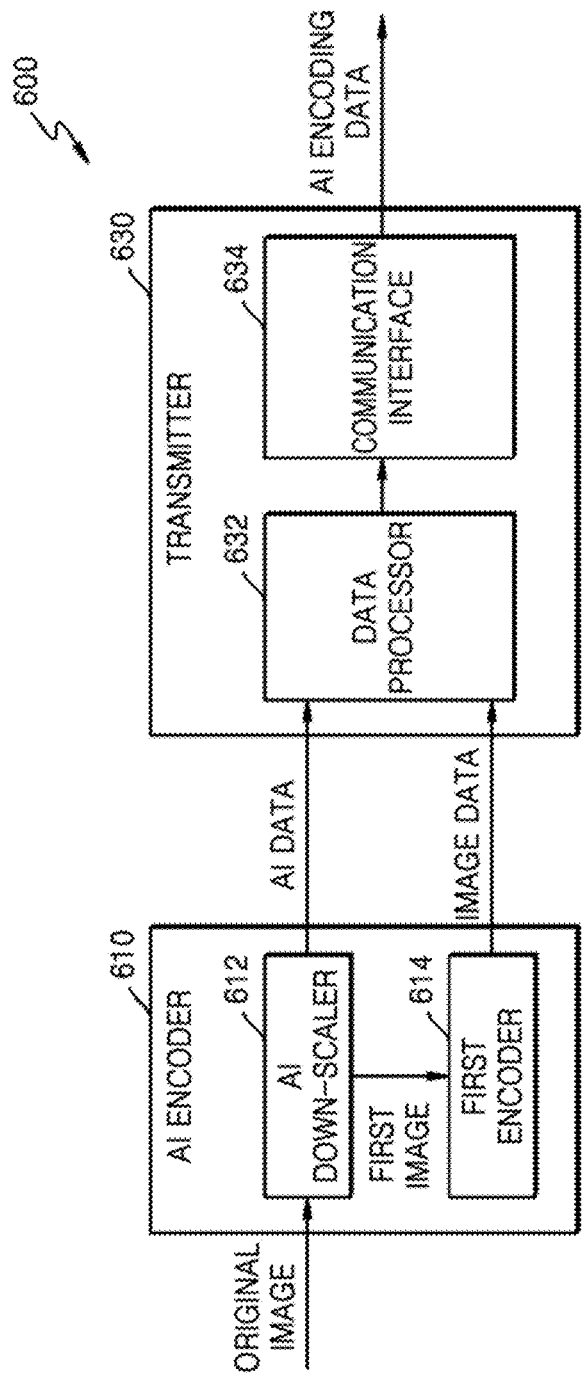
FIG. 7 is a block diagram of a structure of an AI encoding apparatus according to an embodiment of the disclosure.

Each of the plurality of pieces of DNN setting information is obtained jointly with DNN setting information of the first DNN of an AI encoding apparatus 600 of FIG. 7, and the AI up-scaler 234 obtains one piece of DNN setting information among the plurality of pieces of DNN setting information according to an enlargement ratio corresponding to a reduction ratio of the DNN setting information of the first DNN. To this end, the AI up-scaler 234 needs to verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using pieces of information received from the AI encoding apparatus 600.

When DNN setting information for performing the AI upscaling on the third image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set as values included in the obtained DNN setting information.

In detail, parameters of a filter kernel of 3×3 used in any one convolution layer of the second DNN of FIG. 3 are set with {1, 1, 1, 1, 1, 1, 1, 1, 1}, and, when DNN setting information is changed afterwards, the parameters may be replaced by {2, 2, 2, 2, 2, 2, 2, 2, 2} that are parameters included in the changed DNN setting information.

The AI up-scaler 234 may obtain the DNN setting information for upscaling the second image 135 from among the plurality of pieces of DNN setting information, based on information included in the AI data, and the AI data used to obtain the DNN setting information will now be described in detail.

According to an embodiment, the AI up-scaler 234 may obtain the DNN setting information for AI-upscaling the second image 135 from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for doubling the resolution of the second image 135.

According to another embodiment, the AI up-scaler 234 may obtain the DNN setting information for AI-upscaling the second image 135 from among the plurality of pieces of DNN setting information, based on information related to the first image 115 included in the AI data. The AI up-scaler 234 may pre-determine a mapping relationship between pieces of image-related information and pieces of DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding/AI decoding according to an embodiment of the disclosure does not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration, training based on each element needs to be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI-upscaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 with the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use DNN setting information 'A' among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed on the first image 115 via H.264 codec, the AI up-scaler 234 may use DNN setting information 'B' among the plurality of pieces of DNN setting information.

Also, when it is verified, from the information related to the first image 115, that the resolution of the first image 115 is full HD, the bitrate of the image data obtained as the result of performing the first encoding on the first image 115 is 20 Mbps, and the first encoding is performed on the first image 115 via HEVC codec, the AI up-scaler 234 may use DNN setting information 'C' among the plurality of pieces of DNN setting information. When it is verified, from the information related to the first image 115, that the resolution of the first image 115 is full HD, the bitrate of the image data obtained as the result of performing the first encoding on the first image 115 is 15 Mbps, and the first encoding is performed on the first image 115 via HEVC codec, the AI up-scaler 234 may use DNN setting information 'D' among the plurality of pieces of DNN setting information. One of the DNN setting information 'C' and the DNN setting information 'D' is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on a certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI upscaling on the second image 135 from among the plurality of pieces of DNN setting information by considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI upscaling is performed on the second image 135 to the upscaling target corresponding to the downscaling target of the first DNN. The AI up-scaler 234 may obtain the identifier of the DNN setting information included in the AI data and then perform AI upscaling on the second image 135 by using the DNN setting information corresponding to the identifier of the DNN setting information. For example, an identifier indicating each of the plurality of pieces of DNN setting information settable in the first DNN and an identifier indicating each of the plurality of pieces of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI downscaling of the original image 105. In response to the AI data, the AI up-scaler 234 may perform AI upscaling on the second image 135 by using the DNN setting information indicated by the identifier included in the AI data among the plurality of pieces of DNN setting information.

Also, according to an embodiment, the AI data may include the DNN setting information. The AI up-scaler 234 may obtain the DNN setting information included in the AI data and then perform AI upscaling on the second image 135 by using the obtained DNN setting information.

According to an embodiment, when pieces of information (for example, the number of convolution layers, the number of filter kernels for each convolution layer, a parameter of each filter kernel, and the like) constituting the DNN setting information are stored in the form of a lookup table, the AI up-scaler 234 may obtain the DNN setting information by combining some values selected from the values in the lookup table, based on information included in the AI data, and perform AI upscaling on the second image 135 by using the obtained DNN setting information.

According to an embodiment, when a structure of a DNN corresponding to the upscaling target is determined, the AI up-scaler 234 may obtain the DNN setting information, for example, parameters of a filter kernel, corresponding to the determined structure of the DNN.

The AI up-scaler 234 obtains the DNN setting information of the second DNN through the AI data including information related to the first DNN, and performs AI upscaling on the second image 135 through the second DNN set with the obtained DNN setting information, In this case, memory usage and throughput may be reduced compared to when features of the second image 135 are directly analyzed for upscaling.

According to an embodiment, when the second image 135 includes a plurality of frames, the AI up-scaler 234 may independently obtain DNN setting information in units of a certain number of frames, or may obtain common DNN setting information for all of the plurality of frames.

Figure 6:
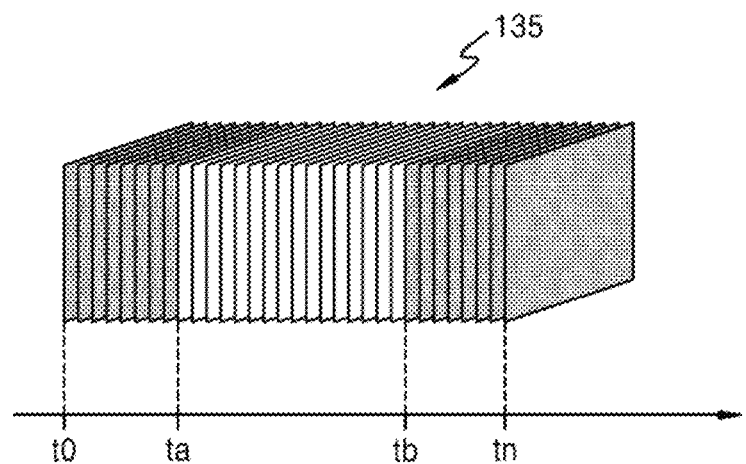
FIG. 6 is a diagram showing a second image including a plurality of frames.

FIG. 6 is a diagram showing the second image 135 including a plurality of frames.

As shown in FIG. 6, the second image 135 may include frames t0 through tn.

According to an embodiment, the AI up-scaler 234 may obtain DNN setting information of a second DNN through AI data, and perform AI upscaling on the frames t0 through tn, based on the obtained DNN setting information. In other words, the frames t0 through tn may be AI-upscaled based on common DNN setting information.

According to another embodiment, the AI up-scaler 234 may perform AI upscaling on some of the frames t0 through tn, for example, the frames t0 through ta, by using DNN setting information 'A' obtained from AI data, and perform AI upscaling on the frames ta+1 through tb by using DNN setting information 'B' obtained from the AI data. Also, the AI up-scaler 234 may perform AI upscaling on the frames tb+1 through tn by using DNN setting information 'C' obtained from the AI data. In other words, the AI up-scaler 234 may independently obtain DNN setting information for each group including a certain number of frames among the plurality of frames, and perform AI upscaling on the frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI upscaling on a first frame by using DNN setting information obtained in relation to the first frame, perform AI upscaling on a second frame by using DNN setting information obtained in relation to the second frame, and perform AI upscaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data. This is because the mode information, the quantization parameter information, or the like may be determined independently for each frame included in the second image 135.

According to another embodiment, the AI data may include information indicating for up to which frame is DNN setting information valid, the DNN setting information being obtained based on the AI data. For example, when the AI data includes information indicating that DNN setting information is valid for up to the frame ta, the AI up-scaler 234 performs AI upscaling on the frames t0 through ta by using DNN setting information obtained based on the AI data. Also, when another piece of AI data includes information indicating that DNN setting information is valid for up to the frame tn, the AI up-scaler 234 performs AI upscaling on the frames ta+1 through tn by using DNN setting information obtained based on the other piece of AI data.

The AI encoding apparatus 600 for performing AI encoding on the original image 105 will now be described with reference to FIG. 7.

FIG. 7 is a block diagram of a configuration of the AI encoding apparatus 600 according to an embodiment of the disclosure.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communication interface 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through a dedicated processor or through a combination of software and a general-purpose processor such as an AP, a CPU or a GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as an AP, a CPU, or a GPU. The AI down-scaler 612 and the first encoder 614 may be implemented through different processors.

The AI encoder 610 performs AI downscaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes pieces of information used during a first encoding process of the first image 115. For example, the image data may include prediction mode information, motion information, and quantization parameter information used to perform the first encoding on the first image 115.

The AI data includes pieces of information enabling the AI up-scaler 234 to perform AI upscaling on the second image 135 to an upscaling target corresponding to a downscaling target of a first DNN. According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing first encoding on the first image 115, or a codec type used during the first encoding of the first image 115.

According to an embodiment, the AI data may include an identifier of mutually agreed DNN setting information such that the AI upscaling is performed on the second image 135 to the upscaling target corresponding to the downscaling target of the first DNN.

Also, according to an embodiment, the AI data may include DNN setting information settable in a second DNN.

The AI down-scaler 612 may obtain the first image 115 obtained by performing the AI downscaling on the original image 105 through the first DNN. The AI down-scaler 612 may determine the downscaling target of the original image 105, based on a pre-determined standard.

In order to obtain the first image 115 matching the downscaling target, the AI down-scaler 612 may store a plurality of pieces of DNN setting information settable in the first DNN. The AI down-scaler 612 obtains DNN setting information corresponding to the downscaling target from among the plurality of pieces of DNN setting information, and performs the AI downscaling on the original image 105 through the first DNN set with the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include pieces of information for obtaining the first image 115 of resolution that is half resolution of the original image 105, for example, the first image 115 of 2 K (2048×1080) that is half of 4 K (4096×2160) of the original image 105, and another piece of DNN setting information may include pieces of information for obtaining the first image 115 of resolution that is quarter resolution of the original image 105, for example, the first image 115 of 2 K (2048×1080) that is quarter of 8 K (8192×4320) of the original image 105.

According to an embodiment, when pieces of information (for example, the number of convolution layers, the number of filter kernels for each convolution layer, and a parameter of each filter kernel) constituting the DNN setting information are stored in the form of a lookup table, the AI down-scaler 612 may obtain the DNN setting information by combining some values selected from the values in the lookup table, based on the downscaling target, and perform AI downscaling on the original image 105 by using the obtained DNN setting information.

According to an embodiment, the AI down-scaler 612 may determine a structure of a DNN corresponding to the downscaling target, and obtain DNN setting information corresponding to the determined structure of the DNN, for example, obtain parameters of a filter kernel.

The plurality of pieces of DNN setting information for performing the AI downscaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may obtain the first image 115 of certain resolution and/or certain quality through the first DNN by setting the first DNN with the DNN setting information selected to perform the AI downscaling on the original image 105. When the DNN setting information for performing the AI downscaling on the original image 105 is obtained from the plurality of pieces of DNN setting information, each layer in the first DNN may process input data, based on pieces of information included in the DNN setting information.

A method, performed by the AI down-scaler 612, of determining the downscaling target will now be described. The downscaling target may indicate, for example, by how much resolution is decreased from the original image 105 to obtain the first image 115.

According to an embodiment, the AI down-scaler 612 may determine the downscaling target, based on at least one of a compression ratio (for example, a resolution difference between the original image 105 and the first image 115, a target bitrate, or the like), a compression quality (for example, a type of bitrate), compression history information, or a type of the original image 105.

For example, the AI down-scaler 612 may determine the downscaling target, based on the compression ratio, the compression quality, or the like, which is pre-set or input from a user.

As another example, the AI down-scaler 612 may determine the downscaling target by using the compression history information stored in the AI encoding apparatus 600. For example, according to the compression history information usable by the AI encoding apparatus 600, an encoding quality, a compression ratio, or the like preferred by the user may be determined, and the downscaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the downscaling target, based on the encoding quality that has been used more frequently than a certain threshold value (for example, an average quality of the encoding quality that has been used more frequently than the certain threshold value), according to the compression history information.

As another example, the AI down-scaler 612 may determine the downscaling target, based on the resolution, type (for example, a file format), or the like of the original image 105.

According to an embodiment, when the original image 105 includes a plurality of frames, the AI down-scaler 612 may independently determine a downscaling target in units of a certain number of frames, or may determine a common downscaling target for all of the plurality of frames.

According to an embodiment, the AI down-scaler 612 may divide the frames included in the original image 105 into a certain number of groups, and independently determine the downscaling target for each group. The same or different down-scaling targets may be determined for each group. The numbers of frames included in the groups may be the same or different according to each group.

According to another embodiment, the AI down-scaler 612 may independently determine a downscaling target for each frame included in the original image 105. The same or different down-scaling targets may be determined for each frame.

An example of a structure of a first DNN 700 on which AI downscaling is based will now be described.

Figure 8:
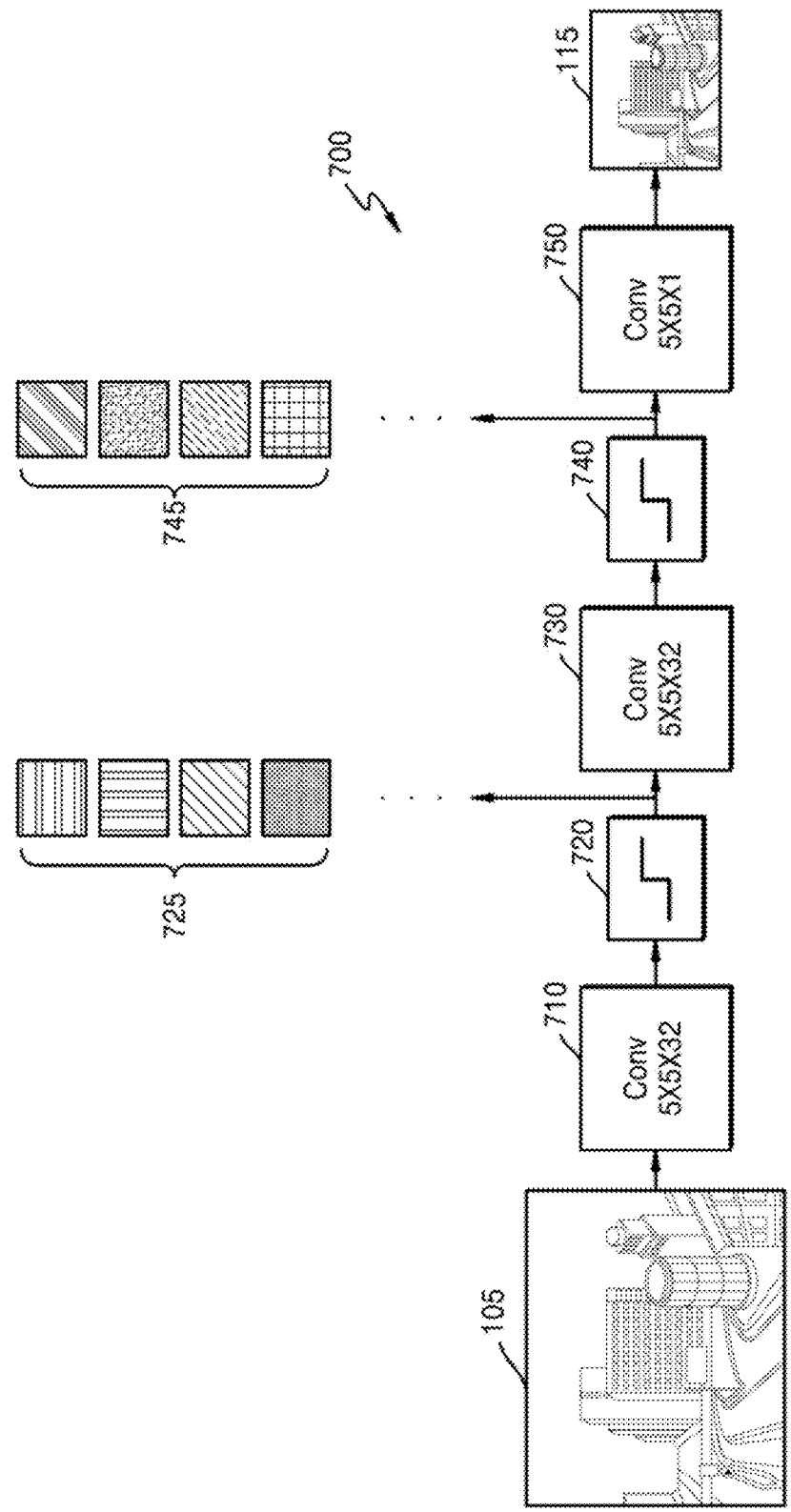
FIG. 8 is a diagram showing a first DNN for performing AI downscaling on an original image.

FIG. 8 is a diagram showing the first DNN 700 for performing AI downscaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to a second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process may be input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 is a layer for outputting a final image, and obtains one output by using one filter kernel. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, parameters of the filter kernels of the first, second, and third convolution layers 810, 830, and 850 of the first DNN 800, and the like, and the plurality of pieces of DNN setting information need to be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers, namely, the first, second, and third convolution layers 710, 730, and 750, and two activation layers, namely, the first and second activation layers 720 and 740, but this is only an example. According to an embodiment, the numbers of convolution layers and activation layers may vary. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer. The ALU may be implemented as a processor. For the convolution operation, the ALU may include a multiplier that performs multiplication between sample values of the original image 105 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in the form of a bitstream, the data processor 632 processes the AI data to be expressed in the form of a bitstream, and transmits the AI data and the image data in the form of one bitstream through the communication interface 634. As another example, the data processor 632 processes the AI data to be expressed in the form of bitstream, and transmits each of a bitstream corresponding to the AI data and a bitstream corresponding to the image data through the communication interface 634. As another example, the data processor 632 processes the AI data to be expressed in the form of a frame or packet, and transmits the image data in the form of a bitstream and the AI data in the form of a frame or packet through the communication interface 634.

The communication interface 630 transmits the AI encoding data obtained as the result of AI encoding through a network. The AI encoding data obtained as the result of AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium (such as a hard disk, a floppy disk, or a magnetic tape), an optical recording medium (such as CD-ROM or DVD), or a magneto-optical medium (such as a floptical disk).

A method of jointly training the first DNN 700 and the second DNN 300 will now be described with reference to FIG. 9.

Figure 9:
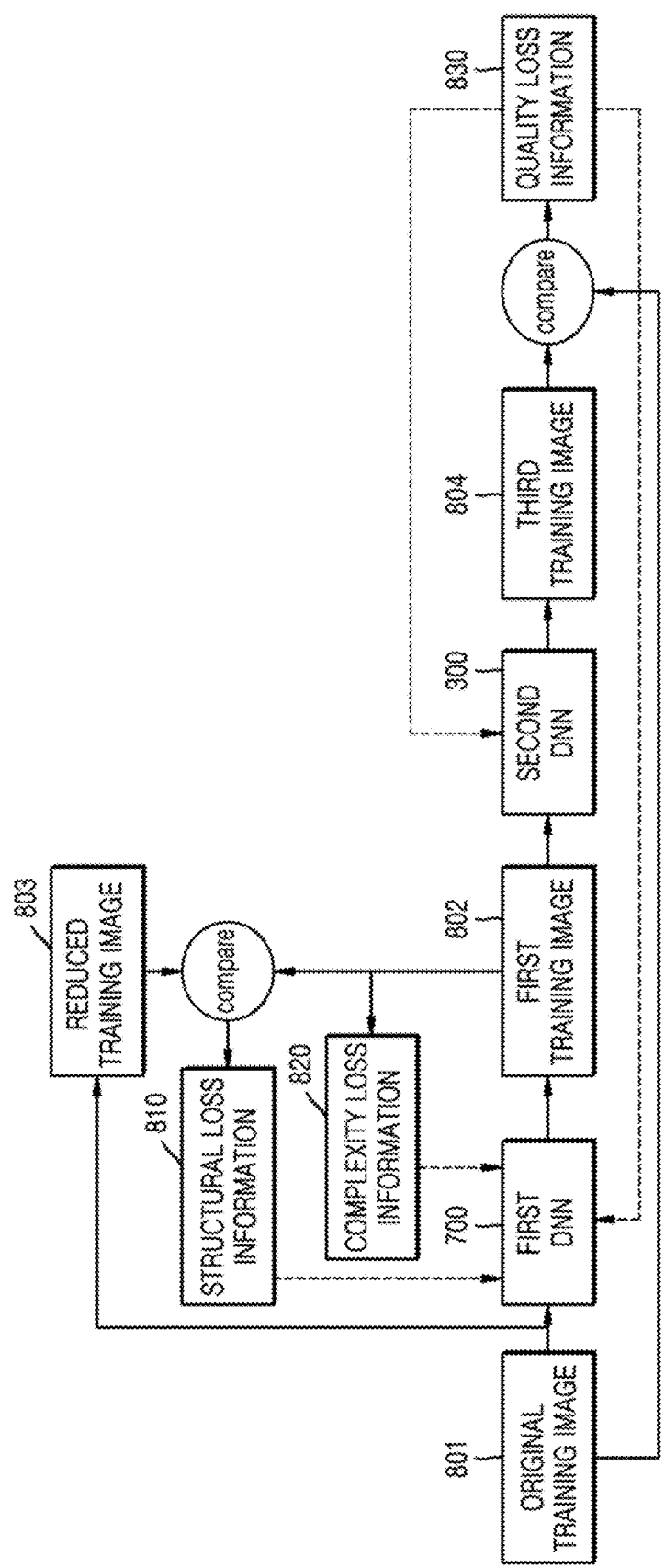
FIG. 9 is a diagram for describing a method of training a first DNN and a second DNN.

FIG. 9 is a diagram for describing a method of training the first DNN 700 and the second DNN 300.

According to an embodiment, the original image 105 on which AI encoding is performed through an AI encoding process is reconstructed to the third image 145 via an AI decoding process, and, in order to maintain similarity between the third image 145 obtained as a result of AI decoding and the original image 105, connectivity between the AI encoding process and the AI decoding process is required. In other words, information lost in the AI encoding process needs to be reconstructed during the AI decoding process, and, to this end, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI downscaling is to be performed, and a first training image 802 is an image obtained by performing AI downscaling on the original training image 801. Also, the third training image 804 is an image obtained by performing AI upscaling on the first training image 802.

The original training image 801 includes a still image or a moving image including a plurality of frames. According to an embodiment, the original training image 801 may include a luminance image extracted from the still image or the moving image including the plurality of frames. According to an embodiment, the original training image 801 may include a patch image extracted from the still image or the moving image including the plurality of frames. When the original training image 801 includes the plurality of frames, the first training image 802, a second training image (not shown), and the third training image 804 also each include a plurality of frames. When the plurality of frames of the original training image 801 are sequentially input to the first DNN 700, the plurality of frames of the first training image 802, the second training image, and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI downscaling, and the first training image 802 is input to the second DNN 300. The third training image 804 is output as a result of performing the AI upscaling on the first training image 802.

Referring to FIG. 9, the first training image 802 is input to the second DNN 300. According to an embodiment, a second training image obtained via first encoding and first decoding on the first training image 802 may be input to the second DNN 300. In order to input the second training image to the second DNN 300, any one codec among MPEG-2, H.264, MPEG-4, HEVC, VC-1, VP8, VP9, and AV1 may be used. In detail, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 is obtained by performing legacy downscaling on the original training image 801. Here, the legacy downscaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set with pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 with the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 801 and the third training image 804. The quality loss information 830 indicates how much the third training image 804 is similar to the original training image 801. The third training image 804 is more similar to the original training image 801 when the quality loss information 830 is small.

Referring to FIG. 9, the structural loss information 810, the complexity loss information 820, and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the structural loss information 810, the complexity loss information 820, and the quality loss information 830 is reduced or minimized.

Also, the second DNN 300 may update a parameter such that the quality loss information 830 is reduced or minimized.

The final loss information for training the first DNN 700 and the second DNN 300 may be determined as Equation 1 below.

$$\text{LossDS} = a*\text{STRUCTURAL LOSS INFORMATION} + b*\text{COMPLEXITY LOSS INFORMATION} + c*\text{QUALITY LOSS INFORMATION}$$

$$\text{LossUS} = d*\text{QUALITY LOSS INFORMATION} \quad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may correspond to pre-determined certain weights.

In other words, the first DNN 700 updates parameters in a direction where LossDS of Equation 1 is reduced, and the second DNN 300 updates parameters in a direction where LossUS of Equation 1 is reduced. When the parameters of the first DNN 700 are updated according to LossDS derived during the training, the first training image 802 obtained based on the updated parameters becomes different from a previous first training image 802 obtained during previous training, and accordingly, the third training image 804 also becomes different from a previous third training image 804 obtained during the previous training. When the third training image 804 becomes different from the previous third training image 804, the quality loss information 830 is also newly determined, and the second DNN 300 updates the parameters accordingly. When the quality loss information 830 is newly determined, LossDS is also newly determined, and thus the first DNN 700 updates the parameters according to the newly determined LossDS. In other words, updating of the parameters of the first DNN 700 leads to updating of the parameters of the second DNN 300, and the updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example. LossUS may be determined based on at least one of the structural loss information 810 or the complexity loss information 820, and the quality loss information 830.

It has been described above that the AI up-scaler 234 of the AI decoding apparatus 200 and the AI down-scaler 612 of the AI encoding apparatus 600 store the plurality of pieces of DNN setting information. Methods of training each of the plurality of pieces of DNN setting information stored in the AI up-scaler 234 and the AI down-scaler 612 will now be described.

As described with reference to Equation 1, the first DNN 700 updates the parameters, based on the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In detail, the parameters of the first DNN 700 may be updated such that the first training image 802 having similar structural information as the original training image 801 is obtained and the image data having a small bitrate is obtained when first encoding is performed on the first training image 802 and also such that the second DNN 300 performing AI upscaling on the first training image 802 may obtain the third training image 804 similar to the original training image 801.

A direction in which the parameters of the first DNN 700 are optimized varies by adjusting the weights a, b, and c of Equation 1. For example, when the weight b is determined to be high, the parameters of the first DNN 700 may be updated by prioritizing a low bitrate over the high quality of the third training image 804. Also, when the weight c is determined to be high, the parameters of the first DNN 700 may be updated by prioritizing high quality of the third training image 804 over a high bitrate or maintenance of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to be a certain value and determining the type of codec to be a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300, when the first DNN 700 and the second DNN 300 are trained while changing values of the weights a, b, and c, and the value of each type of codec.

As described above with reference to FIG. 5, the plurality of pieces of DNN setting information of the first DNN 700 and the second DNN 300 may be mapped to pieces of information related to a first image. To set such a mapping relationship, first encoding may be performed on the first training image 802 output from the first DNN 700, via a certain codec according to a certain bitrate, and the second training image obtained by performing first decoding on a bitstream obtained as a result of performing the first encoding may be input to the second DNN 300. In other words, a DNN setting information pair mapped to the resolution of the first training image 802, a type of the codec used to perform the first encoding on the first training image 802, and the bitrate of the bitstream obtained as a result of performing the first encoding on the first training image 802 may be determined by training the first DNN 700 and the second DNN 300 after setting an environment such that the first encoding is performed on the first training image 802 of a certain resolution via the certain codec according to the certain bitrate. The mapping relationships between the plurality of pieces of DNN setting information of the first DNN 700 and the second DNN 300 and the pieces of information related to the first image may be determined by variously changing the resolution of the first training image 802, the type of codec used to perform the first encoding on the first training image 802, and the bitrate of the bitstream obtained according to the first encoding of the first training image 802.

Figure 10:
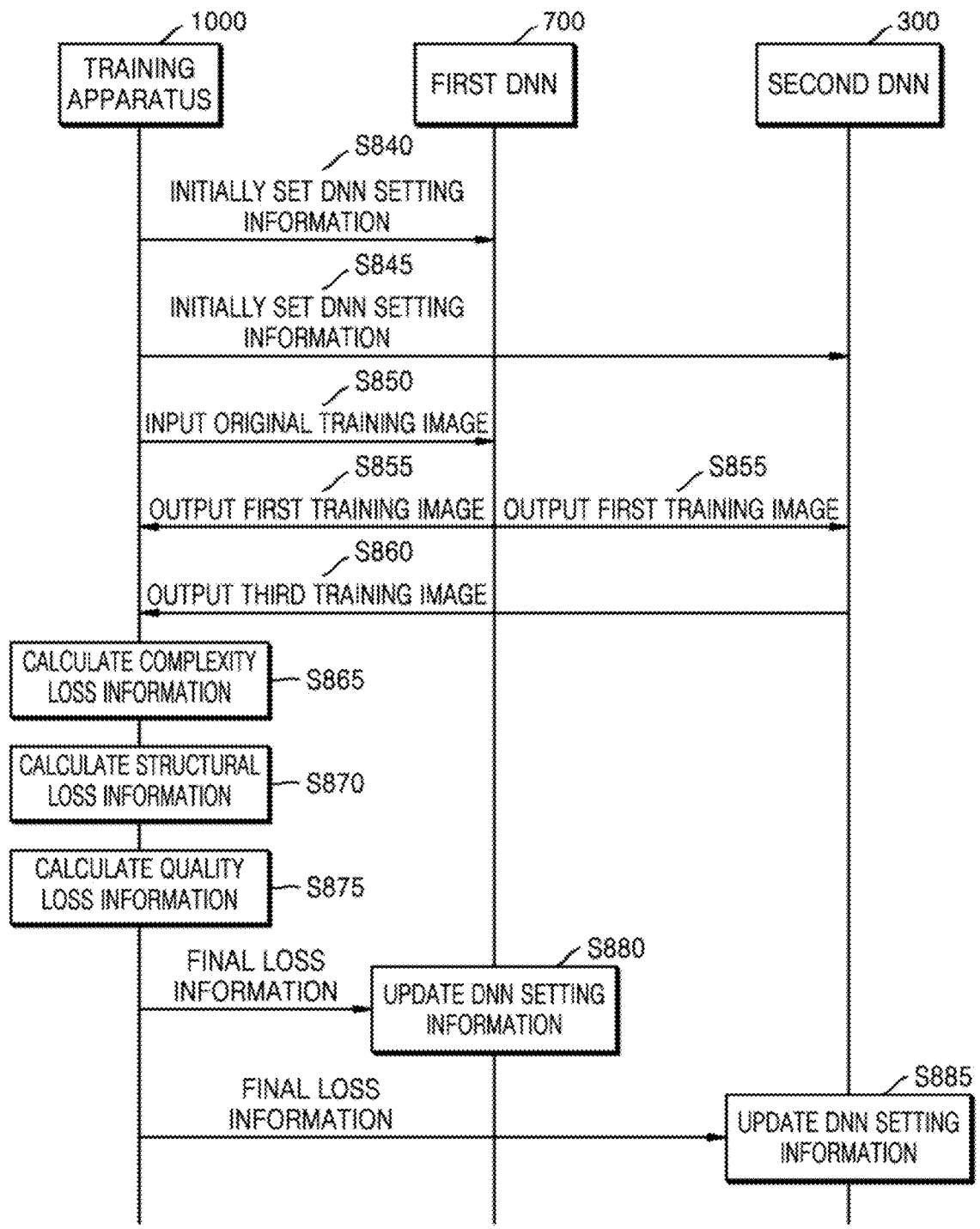
FIG. 10 is a diagram for describing training processes of a first DNN and a second DNN by a training apparatus.

FIG. 10 is a diagram for describing training processes of the first DNN 700 and the second DNN 300 by a training apparatus 1000.

The training of the first DNN 700 and the second DNN 300 described above with reference to FIG. 9 may be performed by the training apparatus 1000. The training apparatus 1000 includes the first DNN 700 and the second DNN 300. The training apparatus 1000 may be, for example, the AI encoding apparatus 600 or a separate server. The pieces of DNN setting information of the second DNN 300 obtained as the training result are stored in the AI decoding apparatus 200.

Referring to FIG. 10, the training apparatus 1000 initially sets DNN setting information of the first DNN 700 and the second DNN 300, in operations S840 and S845. Accordingly, the first DNN 700 and the second DNN 300 may operate according to pre-determined DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially-set DNN setting information, and outputs the first training image 802 obtained by performing AI downscaling on the original training image 801, in operation S855. In FIG. 10, the first training image 802 output from the first DNN 700 is directly input to the second DNN 300. However, the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially-set DNN setting information and outputs the third training image 804 obtained by performing AI upscaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 with the first training image 802, in operation S870.

The training apparatus 1000 calculates the quality loss information 830 by comparing the original training image 801 with the third training image 804, in operation S875.

The first DNN 700 updates the initially-set DNN setting information via a back propagation process based on final loss information, in operation S880. The training apparatus 1000 may calculate final loss information for training the first DNN 700, based on the complexity loss information 820, the structural loss information 810, and the quality loss information 830.

The second DNN 300 updates the initially-set DNN setting information via a back propagation process based on the quality loss information 830 or the final loss information, in operation S1285. The training apparatus 1000 may calculate final loss information for training the second DNN 300, based on the quality loss information 830.

Then, the training apparatus 1000, the first DNN 700, and the second DNN 300 repeat operations S850 through S885 until the pieces of final loss information are minimized, to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Number of frames | Information amount (Bitrate) (Mbps) | | Subjective image quality score (VMAF) | |
| --- | --- | --- | --- | --- | --- | --- |
| | | | HEVC | AI encoding/ AI decoding | HEVC | AI encoding/ AI decoding |
| Content_01 | 8K | 300 frames | 46.3 | 21.4 | 94.80 | 93.54 |
| Content_02 | (7680 × | | 46.3 | 21.6 | 98.05 | 98.98 |
| Content_03 | 4320) | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, even when a subjective quality of image when AI encoding and AI decoding are performed on content including 300 frames of 8 K resolution according to an embodiment of the disclosure is higher than a subjective quality of image when encoding and decoding are performed via HEVC, a bitrate is reduced by 50% or more.

Figure 11:
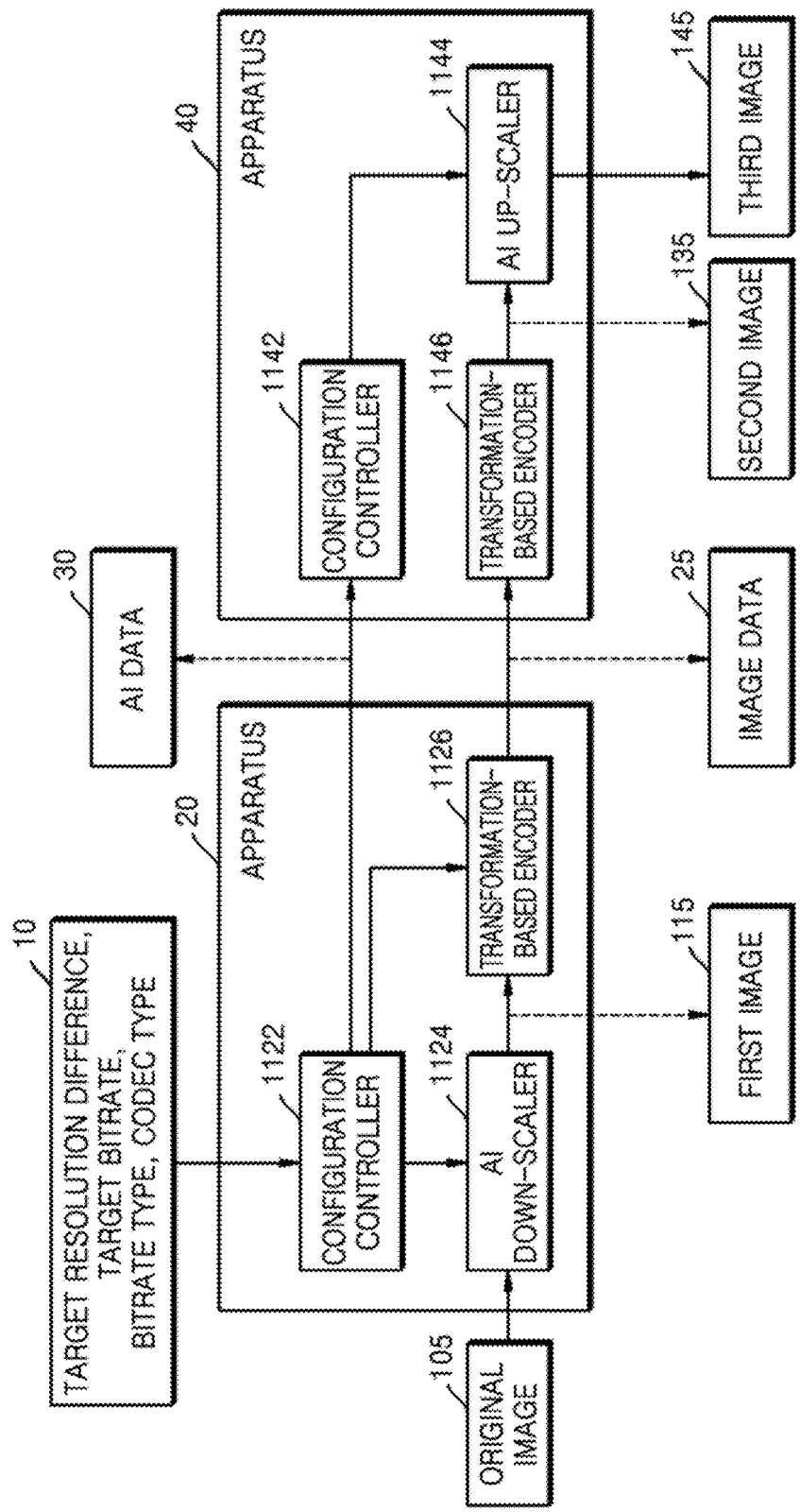
FIG. 11 is a block diagram of an apparatus for performing AI downscaling on an original image and an apparatus for performing AI upscaling on a second image.

FIG. 11 is a diagram of an apparatus 20 for performing AI downscaling on the original image 105 and an apparatus 40 for performing AI upscaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. According to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions that are to be described with reference to FIG. 11, according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions that are to be described with reference to FIG. 11, according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and sets the AI down-scaler 1124 with the obtained DNN setting information. According to an embodiment, the configuration controller 1122 may transmit the received input value 10 to the AI down-scaler 1124, and the AI down-scaler 1124 may obtain the DNN setting information for performing AI downscaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI downscaling is applied, and tone mapping information of a high dynamic range (HDR), together with the input value 10, and the AI down-scaler 1124 may obtain the DNN setting information, based on the input value 10 and the additional information. According to an embodiment, the configuration controller 1122 transmits at least a part of the received input value 10 to the transformation-based encoder 1126, and thus the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI upscaling. The AI data 30 may be provided from the AI down-scaler 1124 to the apparatus 40.

The image data 25 is obtained as the first image 115 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

The configuration controller 1142 controls the operation of the AI up-scaler 1144, based on the AI data 30. According to an embodiment, the configuration controller 1142 obtains DNN setting information for the AI up-scaler 1144 according to the received AI data 30, and sets the AI up-scaler 1144 with the obtained DNN setting information. According to an embodiment, the configuration controller 1142 may transmit the received AI data 30 to the AI up-scaler 1144, and the AI up-scaler 1144 may obtain the DNN setting information for performing AI upscaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI upscaling is applied, and the tone mapping information of an HDR, together with the AI data 30, and the AI up-scaler 1144 may obtain the DNN setting information, based on the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, or the quantization parameter information.

The transformation-based decoder 1146 processes the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 obtains the third image 145 by performing AI upscaling on the second image 135 provided from the transformation-based decoder 1146, based on the set DNN setting information.

The AI down-scaler 1124 may include a first DNN and the AI up-scaler 1144 may include a second DNN. According to an embodiment, pieces of DNN setting information for the first DNN and second DNN are trained according to the training method described above with reference to FIGS. 9 and 10.

Figure 12:
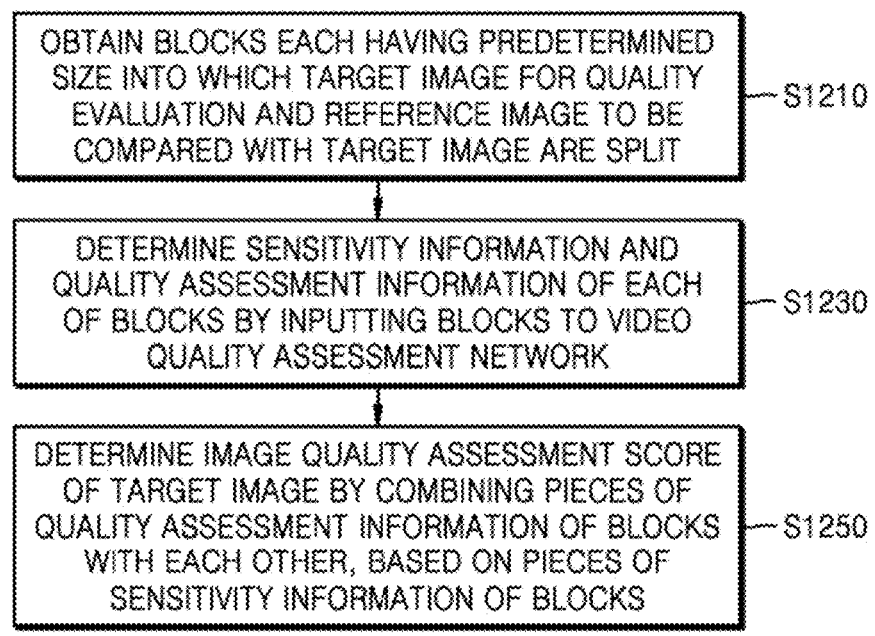
FIG. 12 is a flowchart of a method of evaluating the quality of an image, according to an embodiment of the disclosure.

FIG. 12 is a flowchart of a method of evaluating the quality of a target image, according to an embodiment of the disclosure.

Referring to FIG. 12, in operation S1210, an apparatus 1300 of FIG. 13 for evaluating the quality of a target image, which will be described later, obtains blocks each having a predetermined size into which a target image for quality evaluation and a reference image to be compared with the target image are split, in order to evaluate how much the quality of the target image is similar to that of the reference image to be compared with the target image.

According to an embodiment, a block is a block having a size of txbxbxc, where t may be the number of frames, b may be the horizontal or vertical size of one frame, and c may be the number of color channels. Herein, c may be three color channels.

Figure 13:
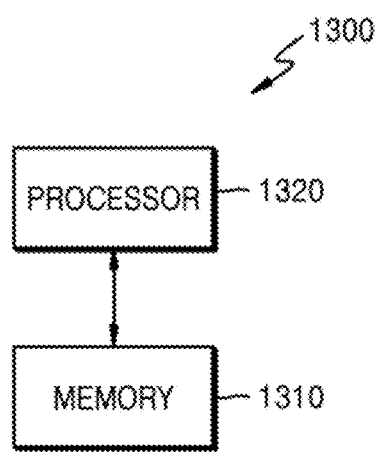
FIG. 13 is a block diagram of an apparatus for evaluating the quality of an image, according to an embodiment of the disclosure.

In operation S1230, the apparatus 1300 of FIG. 13 for evaluating the quality of a target image determines sensitivity information and quality assessment information of each of the blocks by inputting the blocks to a video quality assessment network.

According to an embodiment, the video quality assessment network may determine the sensitivity information of each of the blocks of the target image and the reference image by inputting the blocks to a convolutional neural network (CNN), and may determine the quality assessment information of each of the blocks of the target image and the reference image by inputting the blocks to a capsule neural network.

According to an embodiment, the video quality assessment network may determine respective pieces of sensitivity information of blocks of a target training image and a reference training image by inputting the blocks to a CNN, may determine respective mean opinion score (MOS) averages and respective MOS standard deviations of the blocks of the target training image and the reference training image by inputting the blocks to a capsule neural network, and may be trained using the respective pieces of sensitivity information, the respective MOS averages, and the respective MOS standard deviations.

According to an embodiment, the video quality assessment network may determine respective pieces of sensitivity information of blocks of a target training image and a reference training image by inputting the blocks to a CNN, may determine full reference quality assessment information of each of the blocks of the target training image and the reference training image by inputting the blocks to a capsule neural network, may determine non-reference quality assessment information of each of the blocks of the target training image by inputting the blocks to the capsule neural network, and may be trained using the respective pieces of sensitivity information, the full reference quality assessment information, and the non-reference quality assessment information. The full reference quality assessment information may include a full reference MOS average and a full reference MOS standard deviation of each of the blocks of the target training image and the reference training image, the non-reference quality assessment information may include a non-reference MOS average and a non-reference MOS standard deviation of each of the blocks of the target training image, and the MOS may be a value representing a user's subjective perceived quality.

In operation S1250, the video quality assessment network may determine a final image quality assessment score of the target image by combining the pieces of quality assessment information of the blocks with each other, based on the pieces of sensitivity information of the blocks.

According to an embodiment, the sensitivity information may be used as a weight of each of the blocks, the quality assessment information includes a MOS average of each of the blocks, the final image quality assessment score may be determined by a weighted average of the MOS average based on the weight, and the MOS may be a value representing a user's subjective perceived quality.

According to an embodiment, the quality assessment information may include a MOS average and a MOS standard deviation of each of the blocks, the sensitivity information may be used as a weight of each of the blocks, the final image quality assessment score may be determined by a weighted average of the MOS average based on the weight and a weighted average of the MOS standard deviation based on the weight, and the MOS may be a value representing a user's subjective perceived quality.

FIG. 13 is a block diagram of an apparatus for evaluating the quality of a target image, according to an embodiment of the disclosure.

An apparatus 1300 for evaluating the quality of a target image, according to an embodiment, may include a memory 1310, and at least one processor connected to the memory 1310. The apparatus 1300 for evaluating the quality of a target image, according to an embodiment, may operate as an individual processor or may operate under the control of a central processor. The memory 1310 of the apparatus 1300 for evaluating the quality of a target image may store data received from an external source and data generated by a processor, for example, information about the blocks into which the target image and a reference image are split, sensitivity information of each of the blocks, and quality assessment information.

The processor 1320 of the apparatus 1300 for evaluating the quality of a target image determines the sensitivity information and the quality assessment information of each of the blocks by obtaining blocks, each having a predetermined size, into which the target image and the reference image to be compared with the target image are split and inputting the blocks to a video quality assessment network, and determines a final image quality assessment score of the target image by combining the pieces of quality assessment information, based on the pieces of sensitivity information of each of the blocks.

Figure 14:
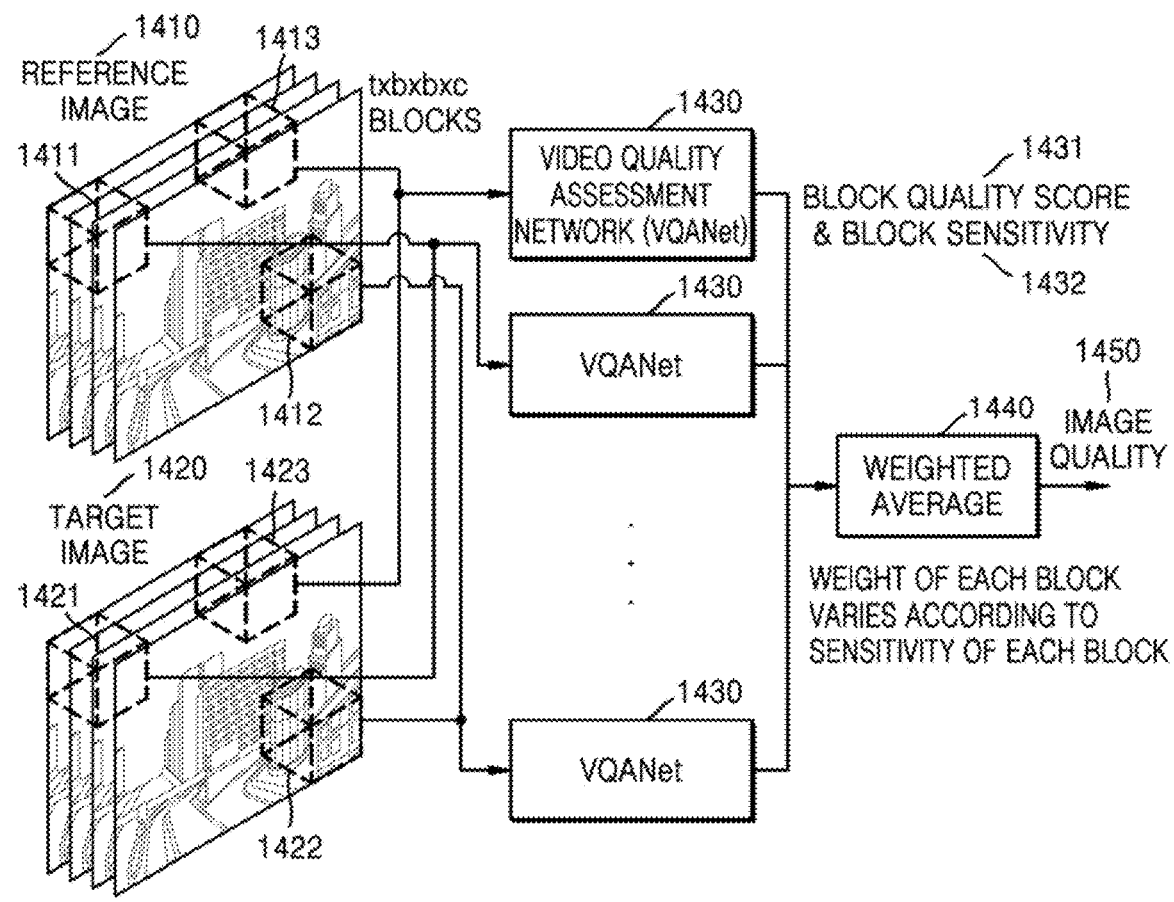
FIG. 14 illustrates an embodiment in which an image quality is determined through a video quality assessment network (VQANet).

FIG. 14 illustrates an embodiment in which a target image quality is determined through a video quality assessment network (VQANet).

Referring to FIG. 14, an image quality assessment score of the target image may be obtained by comparing a reference image 1410 with a target image 1420 by using the VQANet.

According to an embodiment, the reference image 1410 may be an original image, and the target image 1420 may be an image reconstructed after being encoded. Accordingly, an image quality assessment score of the reconstructed image compared with the original image may be obtained, and thus the quality of the reconstructed image may be evaluated.

According to an embodiment, the reference image 1410 may be an image reconstructed after being encoded through a first codec, and the target image 1420 may be an image reconstructed after being encoded through a second codec different from the first codec. Accordingly, an image quality assessment score of the image reconstructed via the second codec compared with the image reconstructed via the first codec may be obtained, and thus the quality of the image reconstructed via the second codec may be evaluated.

According to another embodiment, the reference image 1410 may be an image reconstructed after being encoded through the first codec, and the target image 1420 may be an image reconstructed after being encoded by changing an internal parameter of the same first codec. Accordingly, an image quality assessment score of the image reconstructed by changing the internal parameter in the same codec may be obtained, and thus the quality of the image reconstructed by changing the internal parameter in the same codec may be evaluated.

The reference image 1410 and the target image 1420 may be split into blocks of a predetermined size including time information, space information, and color information and not overlapping with one another. In detail, each block has a size of txbxbxc, where t indicates the number of frames, b indicates a horizontal or vertical size of a frame, and c indicates the number of channels of a color. In general, the number c of channels of a color is three. Because applying a DNN to the entire image provides a very large size of video data and it is not practical to process the entire image at once from the point of view of memory and computation, the entire image is split into blocks of time-space-color, and thus, when the blocks are processed independently and in parallel, the use of memory may be reduced and less calculations may be required.

A first target block 1421 of the target image 1420 and a first reference block 1411 of the reference image 1410 corresponding to the first target block 1421 are input to a VQANet 1430, a second target block 1422 of the target image 1420 and a second reference block 1412 of the reference image 1410 corresponding to the second target block 1422 are input to a VQANet 1430, and a third target block 1423 of the target image 1420 and a third reference block 1413 of the reference image 1410 corresponding to the third target block 1423 are input to a VQANet 1430. Accordingly, a block quality score 1431 and a block sensitivity 1432 for each of the blocks may be determined, and an image quality 1450 of the entire target image 1420 may be determined through a weighted average 1440, based on the block quality score 1431 and the block sensitivity 1432. In this case, the block sensitivity 1432 is used as the weight of each block.

Sensitivity refers to how much each block's own properties affect other blocks. For example, assuming that there is a block representing a portion of the sky (hereinafter, a "sky block") and a block representing a portion of a lawn (hereinafter, a "lawn block"), when the sky block has some errors in an image or the image quality thereof is poor, the sky block is more visible to the human eye, and thus sensitivity is high, and when the lawn block has some errors in an image or the image quality thereof is poor, the lawn block affects the human eye relatively less than the sky block, and thus sensitivity may be low.

Therefore, in the human visual system, because of the properties of each block and relatively different sensitivity of each block to other blocks, the overall quality assessment score for the entire image may not be properly assessed with a simple average of respective local quality scores of the blocks. Therefore, a predicted quality assessment score may be appropriately improved by adopting the block sensitivity of a plurality of blocks as a weight concept.

In order to train the video quality assessment network, a stochastic gradient descent method of dividing the entire training target in units of batches and randomly selecting samples for each batch, is applied, so that the video quality assessment network may be repeatedly trained. It is most effective to perform training on the entire training target, but in this case, too many calculations and tow much memory are required. Thus, the entire training target may be efficiently trained with less calculations and less memory by dividing the entire training target in units of batches and repeatedly training the batches using randomly selected samples.

In other words, for training, each batch may contain blocks randomly selected from the blocks of some of all videos.

In detail, a MOS average of the target image, which is determined through the weighted average 1440, is determined using Equation 2 below.

$$\tilde{q}_i = \Sigma_{j=0}^{N-1} \tilde{q}_{ij} w_{ij} / \Sigma_{j=0}^{N-1} w_{ij} \quad \text{[Equation 2]}$$

$P_i$ indicates a group of blocks randomly selected from an i-th video that is used to train a video quality assessment network in a current batch, $w_{ij}$ indicates a weight of a j-th block of the i-th video, $\tilde{q}_{ij}$ indicates a predicted MOS of the j-th block, and $\tilde{q}_i$ indicates a predicted final MOS average of the i-th video determined through a weighted average.

In this specification, "quality assessment information" refers to a user's subjective perceived quality. For example, although "quality assessment information" MOS is being described using MOS, but embodiments are not limited thereto. In addition to the MOS, other types of indicators indicating the degree to which a user subjectively perceives an image, such as VMAF and SSIM, may be used.

The MOS, which is for determining and determining and comparing a value capable of directly representing the user's subjective perceived quality, may be measured by directly showing a certain image to a user and allowing the user to directly determine a score representing a quality perceived by the user.

Figure 15:
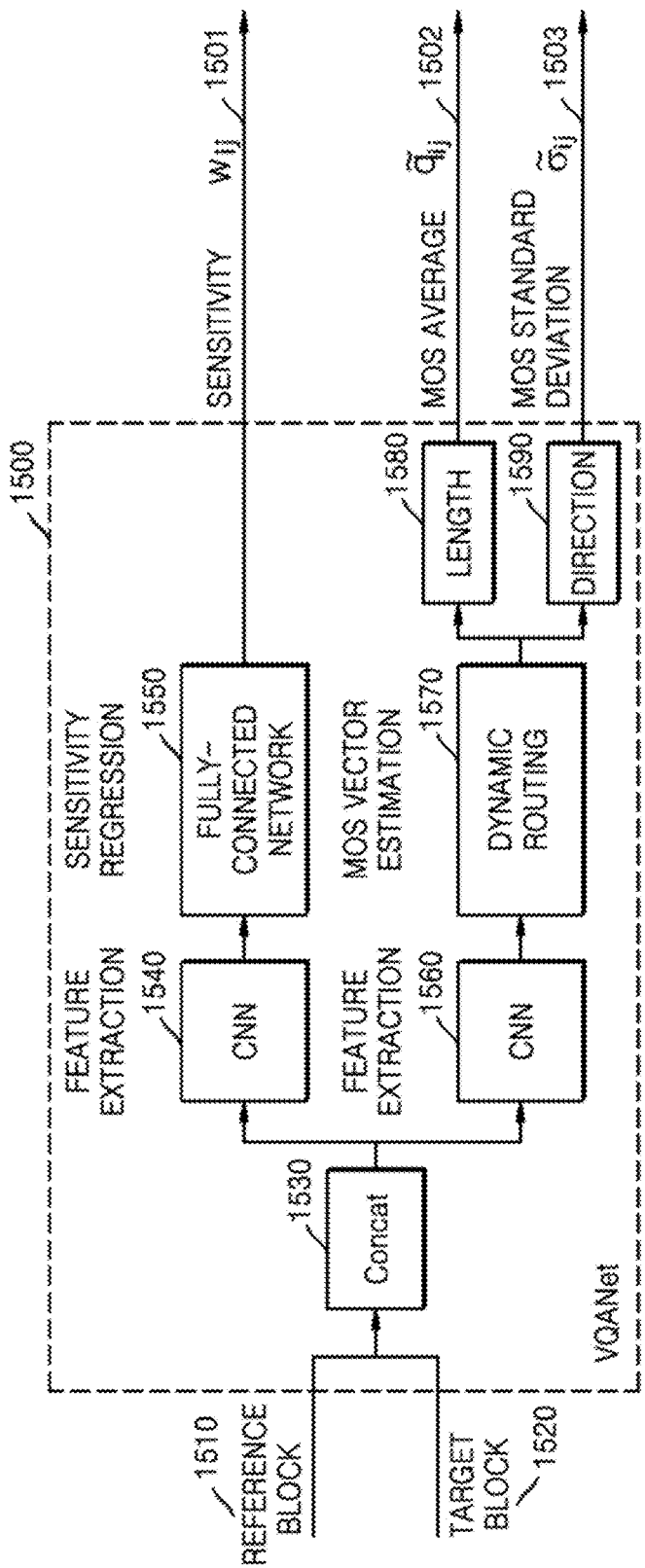
FIG. 15 is a block diagram of a structure of a VQANet according to an embodiment of the disclosure.

FIG. 15 is a block diagram of a structure of a VQANet according to an embodiment of the disclosure.

Referring to FIG. 15, a reference block 1510 and a target block 1520 are input to a VQANet 1500. The reference block 1510 may be an original block of an original image, and the target block 1520 may be a block of an image reconstructed after the original image is encoded. The reference block 1510 may be a block of an image reconstructed after being encoded through a first codec, and the target block 1520 may be a block of an image reconstructed after being encoded through a second codec different from the first codec. The reference block 1510 may be a block of an image reconstructed after being encoded through the first codec, and the target block 1520 may be a block of an image reconstructed after being encoded by changing an internal parameter of the same first codec. The VQANet 1500 receives a reference block 1510 and a target block 1520 corresponding to the reference block 1510 and performs concatenation 1530 on the reference block 1510 and the target block 1520. Then, sensitivity 1501 of a block, an MOS average 5102 of the block, and a MOS standard deviation 1503 of the block may be determined through two DNNs. First, the sensitivity 1501 of a block may be determined by extracting a feature of an image through a convolution operation 1540 and performing regression for sensitivity through a fully-connected network 1550. A feature may be extracted through a convolution operation 1560, and a MOS vector for a block may be predicted through dynamic routing 1570. A length 1580 of the MOS vector may become the MOS average 1502, and a direction 1590 of the MOS vector may become the MOS standard deviation 1503. Each convolution operation may be performed through simple convolution, batch normalization, and a rectified linear unit (ReLU) function, which is an activation function, but embodiments are not limited thereto. The convolution operation 1540 and the fully-connected network 1550 refer to a general CNN, and the convolution operation 1560 and the dynamic routing 1570 refer to a capsule neural network. The general CNN is advantageous for predicting the sensitivity representing the properties of the block itself, because a scalar value without location information for an extracted feature is determined through a fully-connected network after a convolution operation, and the capsule neural network is advantageous for predicting the mean and standard deviation of the MOS, because a vector value including location information on an extracted feature is determined through dynamic routing after a convolution operation. In general, the length of a vector value output from the capsule neural network indicates the possibility of the existence of an object, and the direction thereof indicates the location of the object.

In detail, a video quality assessment network according to an embodiment may determine a scalar value for the properties of the block through a fully-connected network after a convolution operation, and may determine a MOS vector obtained by predicting a user's subjective perceived quality assessment on the block in the dynamic routing 1570 after a convolution operation.

"Concatenation" refers to an operation of connecting an end of data to an end of other data. A value obtained by connecting an end of a reference block to an end of a target block is input to the CNN or the capsule neural network.

The length of an output vector due to dynamic routing may be determined as a MOS average as shown in Equation 3 below.

$$\tilde{q}_{ij} = \|y_{ij}\|_2 \quad \text{[Equation 3]}$$

$y_{ij}$ indicates an output vector obtained as a result of dynamic routing of a j-th block of an i-th video used to train a video quality assessment network in a current batch, and a length value of the output vector is $\tilde{q}_{ij}$, which is a MOS average of the j-th block of the i-th video used for training.

Given that a vector representing a MOS average obtained by predicting all videos used for training through the video quality assessment network is $\tilde{Q}$ and a vector representing an average of scores obtained by a user actually assessing all of the videos used for training is Q, a loss function representing a correlation between two vectors of a current batch may be determined by using an inner product of the two vectors as shown in Equation 4 below.

$$l(\tilde{Q}, Q) = \left\langle \frac{\tilde{Q}}{\|\tilde{Q}\|_2}, \frac{Q}{\|Q\|_2} \right\rangle \quad \text{[Equation 4]}$$

The video quality assessment network may be trained so that the loss function determined according to Equation 4 is minimized.

Because blocks input to the video quality assessment network are obtained by splitting a video to a size of txbxbxc, a result value determined for each block including time information by using a weight in convolution layers is derived the same as a result of performing convolution with respect to the entire image, and at the same time, a result value for the blocks is calculated using a stochastic gradient decent method of randomly selecting a sample. Thus, a time for training the video quality assessment network may be reduced.

Figure 16:
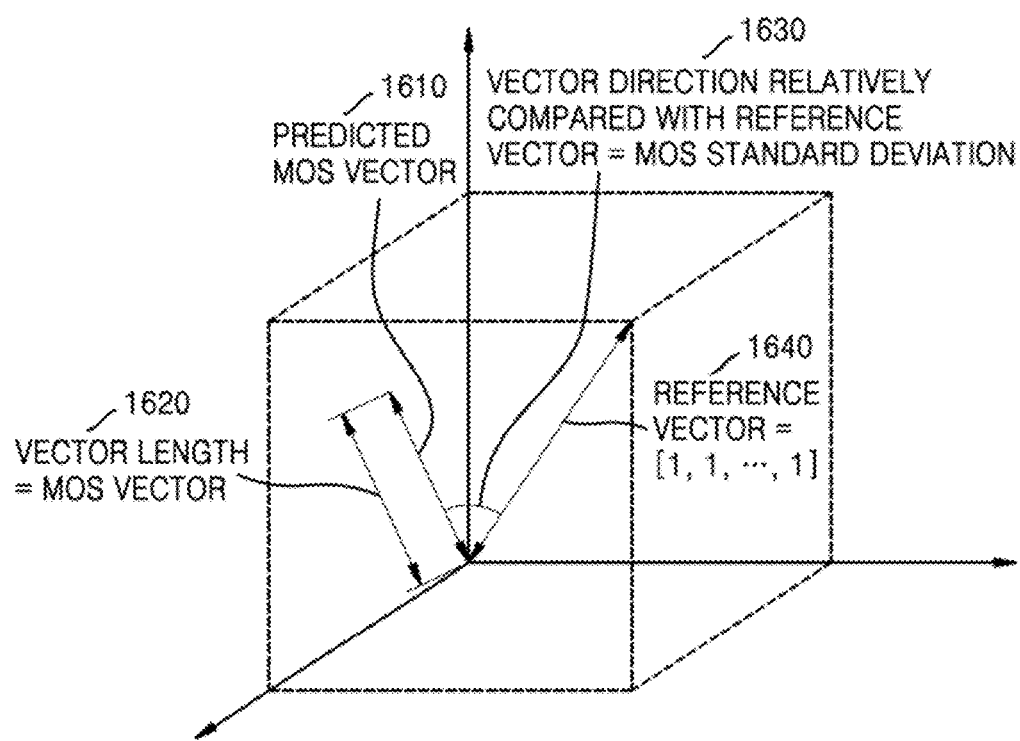
FIG. 16 is a graph showing an example of obtaining a Mean Opinion Score (MOS) average and a MOS standard deviation from a vector of MOS output as a result of dynamic routing.

FIG. 16 is a graph showing an example of obtaining a MOS average and a MOS standard deviation from a vector of MOS output as a result of dynamic routing.

Not only the MOS average but also the MOS standard deviation may be predicted using the output vector obtained through the video quality assessment network.

Referring to FIG. 16, a length of a predicted MOS vector may be determined through an inner product of a MOS vector 1610 predicted through the dynamic routing 1570 and a reference vector 1640 may be determined as a MOS average 1620, and a direction of a MOS vector relatively compared with the reference vector 1640 may be determined as a MOS standard deviation 1630.

According to an embodiment, a final image quality assessment score may include the MOS average and the MOS standard deviation. Accordingly, an image quality may be determined by the MOS average and the MOS standard deviation. In detail, it may be determined that, when having the same MOS average values, an image having a small MOS standard deviation has a better image quality than the other images.

According to another embodiment, to prevent overfitting of a video quality assessment network, regularization that uses a MOS standard deviation may be used in training of the video quality assessment network. Accordingly, by additionally using a MOS standard deviation, accuracy of training may be used, and also overfitting may be prevented.

A MOS standard deviation of $\tilde{\sigma}_{ij}$ j-th block of an i-th video from among the videos used in training is measured by an angle between an output vector $\tilde{y}_{ij}$ obtained by dynamic routing and a reference vector $y_{ref}$, and the angle is determined as in Equation 5 below.

$$\tilde{\sigma}_{ij} = \left| \left\langle \frac{\tilde{y}_{ij}}{\|\tilde{y}_{ij}\|_2}, \frac{y_{ref}}{\|y_{ref}\|_2} \right\rangle \right| = \|y_{ref}\|_2 \left| \left\langle \frac{\tilde{y}_{ij}}{\tilde{q}_{ij}}, y_{ref} \right\rangle \right| \quad \text{[Equation 5]}$$

Similar to a method of obtaining a MOS average, the MOS standard deviation $\tilde{\sigma}_i$ of the i-th video may be determined as in Equation 6 below.

$$\tilde{\sigma}_i = \frac{\sum_{j \in P_i} \tilde{\sigma}_{ij} w_{ij}}{\sum_{j \in P_i} w_{ij}} \quad \text{[Equation 6]}$$

A standard deviation is a final standard deviation of the i-th video determined through a weighted average, $P_i$ indicates a group of blocks randomly selected from the i-th video that is used to train a video quality assessment network in a current batch, $w_{ij}$ indicates a weight of the j-th block of the i-th video, and $\tilde{\sigma}_{ij}$ indicates a MOS standard deviation of the j-th block.

A loss function of a video quality assessment network trained using the MOS average and the MOS standard deviation of the entire video may be determined using Equation 7 below.

$$l_{vqa}(\tilde{Q}_{exp}, Q_{exp}, \tilde{Q}_{std}, Q_{std}) = \lambda_{exp} l(\tilde{Q}_{exp}, Q_{exp}) + l(\tilde{Q}_{std}, Q_{std}) \quad \text{[Equation 7]}$$

$\tilde{Q}_{exp}$ is a vector representing a MOS average predicted for all videos used for training through the video quality assessment network, $Q_{exp}$ is a vector representing an average of scores actually assessed by a person for all videos used for training, $\tilde{Q}_{std}$ is a vector representing a MOS standard deviation predicted for all videos used for training through the video quality assessment network, $Q_{std}$ is a vector representing a standard deviation of the scores actually assessed by a person for all videos used for training, and $l_{vqa}$ represents the loss function of the video quality assessment network.

$\lambda_{exp}$, which is a hyper parameter, is a constant for balancing the contribution of two loss functions with a final loss function. Thus, controlling the hyper parameter is important for regularization using the MOS standard deviation.

In the video quality assessment network, the MOS average and the MOS standard deviation are obtained together, and thus, when regularization using a predicted MOS standard deviation is applied, additional calculations are not required.

By using the loss function $l_{vqa}$ using the MOS average and the MOS standard deviation together, the video quality assessment network may be trained so that overfitting is prevented.

Figure 17:
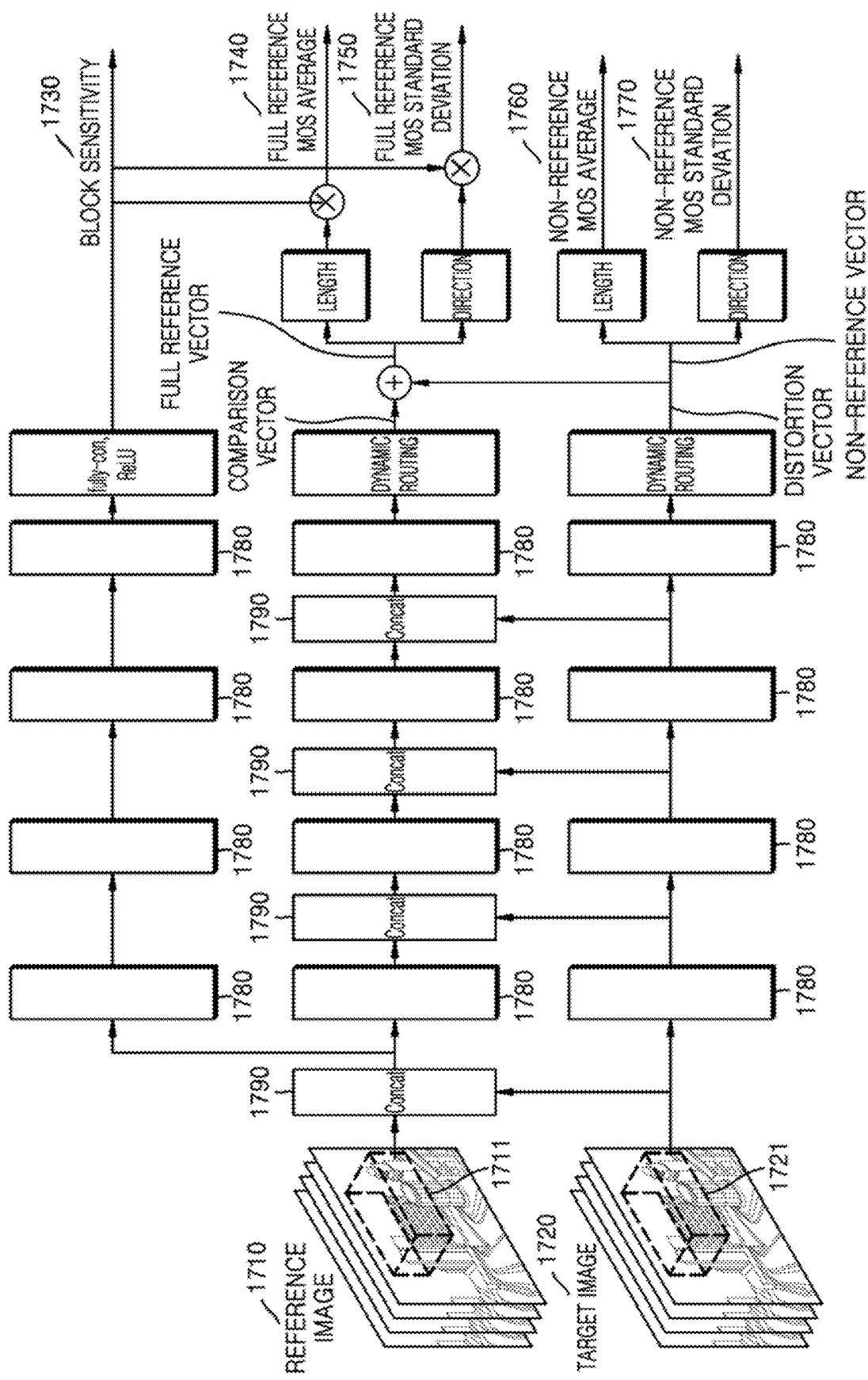
FIG. 17 is a block diagram of a structure of a VQANet according to another embodiment of the disclosure.

FIG. 17 is a block diagram of a structure of a VQANet according to another embodiment of the disclosure.

According to another embodiment, a prediction result of a non-reference video quality assessment may be used in regularization for preventing overfitting of the video quality assessment network. Regardless of whether a reference image is available, the video quality assessment network may extract a meaningful feature from a target image. Through the non-reference video quality assessment, a score of an assessment with respect to the target image by not using the reference image may be estimated even when a result of the assessment is not good. In addition, a full reference video quality assessment may use a value predicted in the non-reference video quality assessment.

Referring to FIG. 17, a reference block 1711 of a reference image 1710 and a target block 1421 of the target image 1720 are input to the VQANet. In a layer 1780 of the VQANet of FIG. 17, a convolutional layer, batch normalization, and an activation layer are performed. The layer 1780 including the convolutional layer, the batch normalization, and the activation layer is performed several times on the reference block 1711 and the target block 1721, and then a block sensitivity 1730 is performed through a fully-connected network. In detail, in the full reference video quality assessment, after the reference block 1711 and the target block 1721 undergo concatenation 1790 and undergo the layer 1780 including the convolutional layer, batch normalization, and the activation layer, a process of performing the concatenation 1790 on a result of performing the layer 1780 including the convolutional layer, batch normalization, and the activation layer with respect to only the target block 1721 and performing the layer 1780 including the convolutional layer, batch normalization, and the activation layer again is repeatedly performed, and then dynamic routing is performed. In the non-reference video quality assessment, the layer 1780 including the convolutional layer, batch normalization, and the activation layer is performed several times on the target block 1721, and then dynamic routing is performed.

A comparison vector for the two blocks is determined through the full reference video quality assessment, and a feature of only the target block is extracted and a distortion vector for distortion of the target block through the non-reference video quality assessment.

A full reference vector is determined based on the comparison vector and the distortion vector, and the distortion vector is determined as a non-reference vector. A length of the full reference vector becomes a full reference MOS average 1740, a direction of the full reference vector becomes a full reference MOS standard deviation 1750, a length of the non-reference vector becomes a non-reference MOS average 1760, and a direction of the non-reference vector becomes a non-reference MOS standard deviation 1770. The non-reference MOS average 1760 and the non-reference MOS standard deviation 1770 are used to train the VQANet. In detail, the non-reference MOS average 1760 and the non-reference MOS standard deviation 1770 are used in regularization for preventing overfitting of the VQANet.

An output vector of the non-reference video quality assessment is used to predict a non-reference image quality score, and a loss function of the non-reference video quality assessment is determined by Equation 8 below.

$$l_{vqa}^{NR} = l_{vqa}(\tilde{Q}_{exp}^{NR}, Q_{exp}, \tilde{Q}_{std}^{NR}, Q_{std})$$ [Equation 8]

where $l_{vqa}^{NR}$ indicates the loss function of the non-reference video quality assessment, $\tilde{Q}_{exp}^{NR}$ is a vector representing a MOS average predicted through the non-reference video quality assessment, $\tilde{Q}_{std}^{NR}$ is a vector representing a MOS standard deviation predicted through the non-reference video quality assessment, $Q_{exp}$ is a vector representing an average of scores actually assessed by a person with respect to all of the videos used in training, and $Q_{std}$ is a vector representing a standard deviation of the scores actually assessed by a person with respect to all of the videos used in training.

In the full reference video quality assessment, respective features of both the reference block and the target block are commonly extracted to assess a full reference video quality score. A full reference video quality assessment of a certain layer uses both a feature in the full reference video quality assessment and a feature of a previous convolutional layer in the non-reference video quality assessment. A loss function of the full reference video quality assessment is determined by Equation 9 below.

$$l_{vqa}^{FR} = l_{vqa}(\tilde{Q}_{exp}^{FR}, Q_{exp}, \tilde{Q}_{std}^{FR}, Q_{std})$$ [Equation 8]

where $l_{vqa}^{FR}$ indicates the loss function of the full reference video quality assessment, $\tilde{Q}_{exp}^{FR}$ is a vector representing a MOS average predicted through the full reference video quality assessment, $\tilde{Q}_{std}^{FR}$ is a vector representing a MOS standard deviation predicted through the full reference video quality assessment, $Q_{exp}$ is a vector representing an average of scores actually assessed by a person with respect to all of the videos used in training, and $Q_{std}$ is a vector representing a standard deviation of the scores actually assessed by a person with respect to all of the videos used in training.

When loss functions obtained in the non-reference video quality assessment and the full reference video quality assessment are combined, a loss function for training as shown in Equation 10 below is determined.

$$l_{train} = \lambda_{FR} l_{vqa}^{FR} + l_{vqa}^{NR}$$ [Equation 10]

The video quality assessment network may be trained so that the loss function is minimized. In detail, overfitting of the video quality assessment network may be prevented by performing training based on also a feature of the non-reference video quality assessment. Herein, $\lambda_{FR}$ is a hyper parameter, and thus is a constant for balancing the contribution of two loss functions with a final loss function. Controlling the hyper parameter $\lambda_{FR}$ is important in regularization using the non-reference video quality assessment.

The video quality assessment network may be trained through the loss function additionally using the non-reference video quality assessment so that overfitting is prevented.

Figure 18:
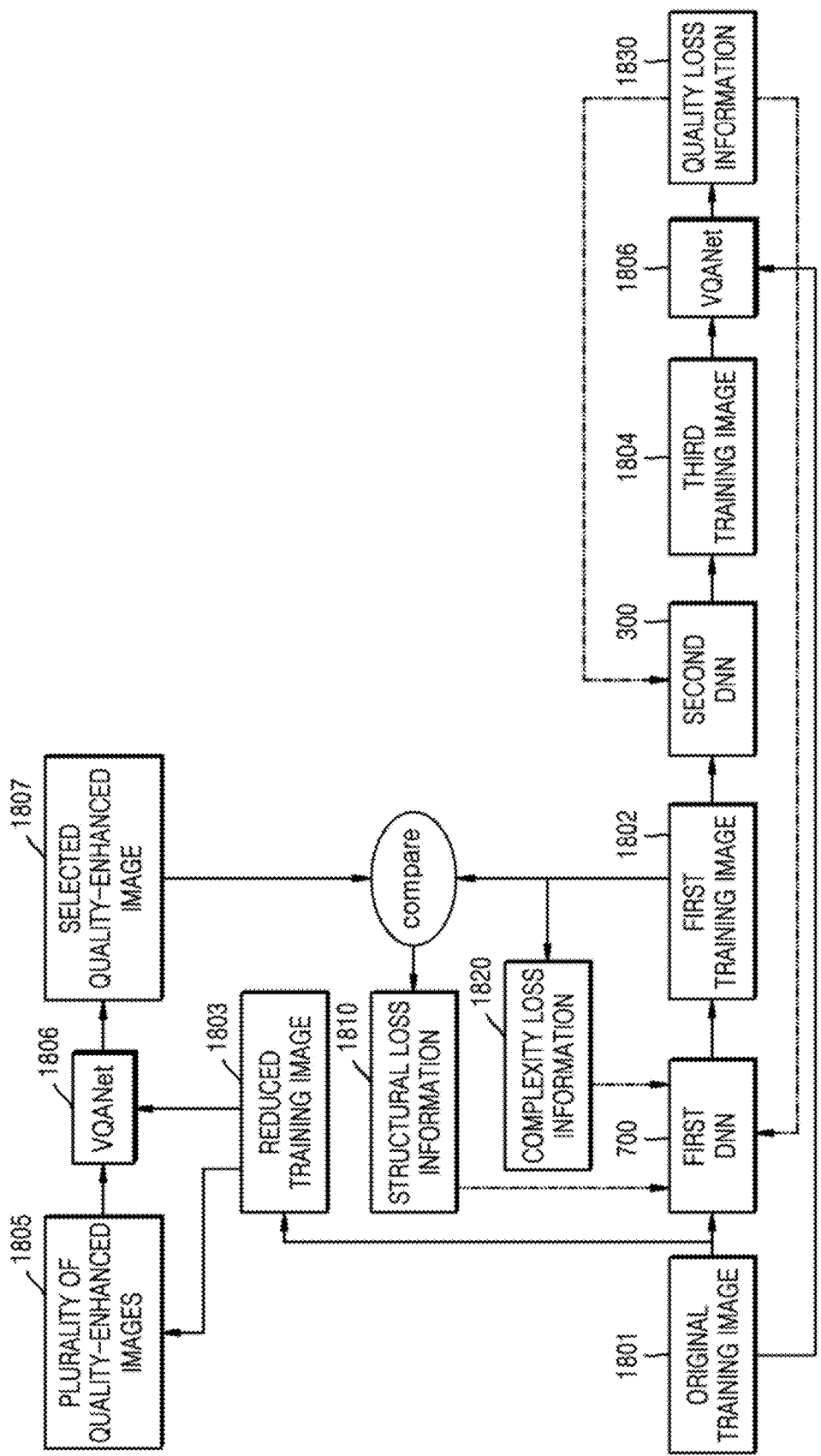
FIG. 18 is a diagram for describing a method of training a first DNN for downscaling and a second DNN for upscaling by applying a VQANet to the first DNN and the second DNN.

FIG. 18 is a diagram for describing a method of training the first DNN 700 for downscaling and the second DNN 300 for upscaling by applying VQANet to the first DNN 700 and the second DNN 300.

Referring to FIG. 18, training processes in which VQANet is applied to the first DNN and the second DNN of FIG. 9.

In FIG. 18, an original training image 1801 is a target of AI downscaling, and thus is an image corresponding to the original training image 801 of FIG. 9, and a first training image 1802 is an image obtained by AI-downscaling the original training image 1801 through the first DNN 700 trained using the VQANet. Also, a third training image 1804 is an image obtained by AI-upscaling the first training image 1802 through the second DNN 300 trained using the VQANet. For joint training of the first DNN 700 and the second DNN 300, the original training image 1801 is input to the first DNN 700. The original training image 1801 input to the first DNN 700 is output as the first training image 1802 via the AI downscaling, and the first training image 1802 is input to the second DNN 300. The third training image 1804 is output as a result of performing the AI upscaling on the first training image 1802.

Referring to FIG. 18, the first training image 1802 is input to the second DNN 300. According to an embodiment, a second training image obtained as first encoding and first decoding are performed on the first training image 1802 may be input to the second DNN 300. In order to input the second training image to the second DNN 300, any one codec among MPEG-2, H.264, MPEG-4, HEVC, VC-1, VP8, VP9, and AV1 may be used. In detail, any one codec among MPEG-2, H.264, MPEG-4, HEVC, VC-1, VP8, VP9, and AV1 may be used to perform first encoding on the first training image 1802 and first decoding on image data corresponding to the first training image 1802.

Referring to FIG. 18, separate from the first training image 1802 being output through the first DNN 700, a reduced training image 1803 is generated by performing legacy downscaling on the original training image 1801. The reduced training image 1803 correspond to the reduced training image 803 of FIG. 9. Here, the legacy downscaling may include at least one of bilinear scaling, bicubic scaling, lanczos scaling, or stair step scaling. The reduced training image 1803 may be generated such that a structural feature of the original training image 1801 is preserved. Thereafter, a plurality of enhancement processes for enhancing the video quality of the reduced training image 1803 may be performed on the reduced training image 1803 to generate a plurality of quality-enhanced images 1805. Such an enhancement method may include, for example, a contrast enhancement method, an edge enhancement method, a noise reduction method, and a noise removal method.

The reduced training image 1803 and one of the plurality of quality-enhanced images 1805 obtained as a result of the plurality of enhancement processes on the reduced training image 1803 may be input to a VQANet 1806. The reduced training image 1803 may be uses as a reference image of the VQANet 1806, and one of the plurality of quality-enhanced images 1805 may be used as a target image. A video quality result of each of the plurality of quality-enhanced images may be obtained by applying the VQANet 1806 to each of the plurality of quality-enhanced images 1805. A quality-enhanced image having a highest video quality assessment score may be selected by comparing the respective video quality assessment scores of the plurality of quality-enhanced images.

In detail, the reduced training image 1803 may be determined by reducing the original training image 1801 according to the structural feature of the original training image 1801, and the plurality of quality-enhanced images 1805 may be determined by applying a plurality of pre-determined enhancement methods to the reduced training image 1803. The plurality of quality-enhanced images 1805 may be split into blocks having a certain predetermined size and the reduced training image 1803 may be split into blocks having a predetermined size, sensitivity information and quality assessment information of the blocks may be determined by inputting the blocks to the video quality assessment network 1806, and video quality assessment scores of the plurality of quality-enhanced images 1805 may be determined based on the sensitivity information and the quality assessment information of the blocks. Thereafter, the video quality assessment scores of the plurality of quality-enhanced images 1805 may be compared with each other to select a quality-enhanced image having a highest video quality assessment score.

For example, when an image quality result is expressed as a MOS, a quality-enhanced image having a highest predicted video quality assessment score may be selected, and, when a plurality of quality-enhanced images have the highest predicted MOS average score, one of the plurality of quality-enhanced images may be selected according to a pre-determined method.

When an image quality result is expressed as a MOS, a quality-enhanced image having a highest predicted video quality assessment score may be selected, and, when a plurality of quality-enhanced images have the highest predicted MOS average score, a quality-enhanced image having a lowest predicted MOS standard deviation may be selected from among the plurality of quality-enhanced images according to a pre-determined method.

A selected quality-enhanced image 1807 may be compared with the first training image 1802 to obtain structural loss information 1810 corresponding to a difference between the selected quality-enhanced image 1807 and the first training image 1802. The first DNN 700 is trained to minimize the structural loss information 1810.

The obtained structural loss information 1810 is used instead of the structural loss information 810 of FIG. 9.

When a structure feature of the first image 115 greatly varies compared with that of the original image 105, encoding efficiency may be degraded. Accordingly, to prevent degradation of the encoding efficiency, the reduced training image 1803 preserving the structural feature of the original training image 1801 is generated. Because the reduced training image 1803 may have a low quality or the structural feature thereof may not be preserved, the plurality of quality-enhanced images 1805 are generated by performing quality enhancement on the reduced training image 1803, the VQANet 1806 is applied to each of the reduced training image 1803 and the plurality of quality-enhanced images 1805, and the quality-enhanced image 1807 having a best image quality result is selected from among the plurality of quality-enhanced images 1805, and thus the first DNN 700 is trained such that the first training image 1802 is similar to the selected quality-enhanced image 1807.

Referring back to FIG. 18, the first training image 1802 is input to the second DNN 300, and a third training image 1804 is output to the second DNN 300. The original training image 1801 and the third training image 1804 are applied to the VQANet 1806, and thus quality loss information 1830 corresponding to image quality assessment loss information is determined. The second DNN 300 may be trained based on the image quality assessment loss information of the third training image 1804.

In detail, the third training image 1804 for quality evaluation and the original training image 1801, which is to be compared with the third training image 1804, may be split into blocks having a predetermined size, the blocks may be input to a video quality assessment network to determine sensitivity information and quality assessment information of each of the blocks, and the quality loss information 1830, namely, the image quality assessment loss information, may be determined based on the video quality assessment score of the third training image 1804 determined by combining the pieces of quality assessment information, based on the pieces of sensitivity information of the blocks.

The image quality assessment loss information may include a loss function based on the video quality assessment score determined using the sensitivity information and the quality assessment information of the third training image determined through the video quality assessment network.

The quality loss information 1830 corresponding to the image quality assessment loss information is used instead of the quality loss information 830 of FIG. 9.

Complexity loss information 1820 is used instead of the complexity loss information 820 of FIG. 9. The complexity loss information 1820 may be determined based on spatial complexity of the first training image 1802 downscaled through the first DNN 700 trained using the VQANet. For example, a total variance value of the first training image 1802 may be used as the spatial complexity. The complexity loss information 1820 is related to a bitrate of image data generated by performing first encoding on the first training image 1802. It is defined that the bitrate of the image data is low when the complexity loss information 1820 is small.

According to an embodiment, the first DNN 700 and the second DNN 300 may be jointly trained using the structural loss information 1810 and the quality loss information 1830 obtained using the VQANet instead of the structural loss information 810 and the quality loss information 830 of FIG. 9 and using complexity loss information 1820 obtained from the first training image 1802 output through the first DNN 700 using the VQANet instead of the complexity loss information 820 of FIG. 9, according to the same method as that of FIG. 9. In other words, the first DNN 700 is trained using all of the structural loss information 1810, the complexity loss information 1820, and the quality loss information 1830, and the second DNN 300 is trained using the quality loss information 1830.

The first DNN 700 may update a parameter such that final loss information determined based on the structural loss information 1810, the complexity loss information 1820, and the quality loss information 1830 is reduced or minimized. Also, the second DNN 300 may update a parameter such that the quality loss information 1830 is reduced or minimized.

The final loss information for training the first DNN 700 and the second DNN 300 may be determined as Equation 1 described above, and the parameter may be updated using the same method as that of FIG. 9.

The above-described embodiments of the disclosure can be written as computer-executable programs, and the written computer-executable programs can be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the above-described DNN may be implemented by using a software module. When the DNN model is implemented by using a software module (for example, a program module including instructions), the DNN model may be stored in a computer-readable recording medium.

The DNN model may be a part of the above-described AI decoding apparatus 200 or AI encoding apparatus 600 by being integrated in the form of a hardware chip. For example, the DNN model may be manufactured in the form of an exclusive hardware chip for AI, or may be manufactured as a part of an existing general-purpose processor (for example, a CPU or an AP) or a graphic-exclusive processor (for example, a GPU).

The DNN model may be provided in the form of downloadable software. For example, a computer program product may include a product (e.g., a downloadable application) in the form of a software program that is electronically distributed through a manufacturer or an electronic market. For electronic distribution, at least a portion of the software program may be stored on a storage medium or may be created temporarily. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

The invention claimed is:

1. A method of evaluating a quality of a target image, the method comprising:
    obtaining blocks each having a predetermined size by splitting a target image for evaluating a quality and a reference image that is to be compared with the target image;
    determining pieces of sensitivity information and pieces of quality assessment information of the blocks by inputting the blocks to a video quality assessment network; and
    determining a final image quality assessment score of the target image by combining the pieces of quality assessment information of the blocks with each other, based on the pieces of sensitivity information of the blocks.

2. The method of claim 1, wherein the video quality assessment network is configured to:
    determine the pieces of sensitivity information of the blocks by inputting the blocks to a convolutional neural network, and
    determine the pieces of quality assessment information of the blocks by inputting the blocks to a capsule neural network.

3. The method of claim 1, wherein the sensitivity information is used as a weight of each of the blocks,
    wherein the quality assessment information comprises a mean opinion score (MOS) average of each block of the blocks, and
    wherein the final image quality assessment score is further determined based on a weighted average of the MOS average for the each block based on the weight, and
    wherein the MOS is a value representing a user's subjective perceived quality.

4. The method of claim 1, wherein the video quality assessment network is configured to:

determine pieces of sensitivity information of blocks of a target training image and a reference training image by inputting the blocks of the target training image and the reference training image to a convolutional neural network, and determine mean opinion score (MOS) averages and MOS standard deviations of the blocks of the target training image and the blocks of the reference training image by inputting the blocks of the target training image and the blocks of the reference training image to a capsule neural network, and wherein the video quality assessment network is trained using the pieces of sensitivity information, the MOS averages, and the MOS standard deviations.

5. The method of claim 1, wherein the video quality assessment network is configured to:

determine pieces of sensitivity information of blocks of a target training image and a reference training image by inputting the blocks of the target training image and the reference training image to a convolutional neural network, determine pieces of full reference quality assessment information of the blocks of the target training image and the reference training image by inputting the blocks of the target training image and the reference training image to a capsule neural network, and determine pieces of non- reference quality assessment information of blocks of the target training image by inputting the blocks of the target training image to the capsule neural network, and wherein the video quality assessment network is trained using the pieces of sensitivity information, the full reference quality assessment information, and the non-reference quality assessment information.

6. The method of claim 5, wherein the full reference quality assessment information comprises a full reference mean opinion score (MOS) average and a full reference MOS standard deviation of each block of the blocks of the target training image and the reference training image, wherein the non-reference quality assessment information comprises a non-reference MOS average and a non-reference MOS standard deviation of each block of the blocks of the target training image, and wherein the MOS is a value representing a user's subjective perceived quality.

7. The method of claim 1, wherein the predetermined size is txbxbxc, where t indicates the number of frames, b indicates a horizontal or vertical size, and c indicates the number of color channels.

8. The method of claim 1, wherein the quality assessment information comprises a mean opinion score (MOS) average and a MOS standard deviation of each block of the blocks, wherein the sensitivity information is used as a weight of the each block, wherein the final image quality assessment score is further determined based on a weighted average of the MOS average based on the weight and a weighted average of the MOS standard deviation based on the weight, and wherein the MOS is a value representing a user's subjective perceived quality.

9. The method of claim 1, wherein the combining the pieces of quality assessment information of the blocks with each other comprises determining a weighted average of the pieces of quality information, and wherein the weighted average is determined by using the pieces of sensitivity information as weights.

\* \* \* \* \*